(12) United States Patent
Tang

(10) Patent No.: US 6,184,336 B1
(45) Date of Patent: Feb. 6, 2001

(54) BIODEGRADABLE POLY(AMINO ACID)S, DERIVATIZED AMINO ACID POLYMERS AND METHODS FOR MAKING SAME

(75) Inventor: Jiansheng Tang, Naperville, IL (US)

(73) Assignee: Nalco Chemical Company, Naperville, IL (US)

( * ) Notice: Under 35 U.S.C. 154(b), the term of this patent shall be extended for 0 days.

(21) Appl. No.: 09/226,862

(22) Filed: Jan. 7, 1999

Related U.S. Application Data

(60) Division of application No. 08/722,401, filed on Sep. 30, 1996, now Pat. No. 5,929,198, which is a continuation-in-part of application No. 08/717,374, filed on Sep. 20, 1996, now Pat. No. 5,876,623, which is a continuation-in-part of application No. 08/683,001, filed on Jul. 16, 1996, now Pat. No. 5,776,875, and a continuation-in-part of application No. 08/686,616, filed on Jul. 19, 1996, now Pat. No. 5,750,070.

(51) Int. Cl.$^7$ .......................... C08G 63/44; C08G 67/00; C08G 69/10; C08G 69/44
(52) U.S. Cl. ............................................. 528/288; 528/328
(58) Field of Search ..................................... 528/288, 328

(56) References Cited

U.S. PATENT DOCUMENTS 5,531,934    7/1996   Freeman et al. ..................... 252/390

FOREIGN PATENT DOCUMENTS 0 526 786    2/1993   (EP) .

OTHER PUBLICATIONS

J. Kálal et al., "Affinity Chromotography and Affinity Therapy", *Affinity Chromotography and Techniques TCJ Gribanu*, J. Visser and R.J. Nivard (Editors), Copyright 1982 Elsevier Scientific Publishing Company, Amsterdam, The Netherlands, pp. 365–374.

*Primary Examiner*—Nathan M. Nutter
(74) *Attorney, Agent, or Firm*—Michael B. Martin; Thomas M. Breininger

(57) ABSTRACT

New and improved polyamino acid polymers and derivatized polyamino acid polymers are provided. Relatively high molecular weight poly(succinimides) are prepared by solid phase polymerization of aspartic acid or glutamic acid in the presence of a super phosphoric acid catalyst. The poly (succinimides) may be hydrolyzed to provide biodegradable polyaspartic acid or polyglutamic acid homopolymer having weight average molecular weights $\geq 70,000$. Higher molecular weight, water soluble, cross-liked polyamino acid polymers and gels are also provided. In a preferred embodiment, the poly(succinimides) are derivatized in aqueous media to provide storage stable, substantially linear, biodegradable polyamino acid polymers having pendant hydroxyl, ether, hydroxyalkylaminoalkyl, hydroxyalkoxyalkyl, carboxyl, sulfonoalkyl and/or phosphonoalkyl functionalities. The polymers are useful as chelants in various water treatment applications.

5 Claims, No Drawings

BIODEGRADABLE POLY(AMINO ACID)S, DERIVATIZED AMINO ACID POLYMERS AND METHODS FOR MAKING SAME

This is a divisional of Ser. No. 08/722,401, filed Sep. 30, 1996, now U.S. Pat. No. 5,929,198, which is a continuation-in-part of Ser. No. 08/717,374, filed Sep. 20, 1996, now U.S. Pat. No. 5,876,623, which is a continuation-in-part of Ser. No. 08/683,001, filed Jul. 16, 1996, now U.S. Pat. No. 5,776,875 and Ser. No. 08/686,616, filed Jul. 19, 1996, now U.S. Pat. No. 5,750,070.

BACKGROUND OF THE INVENTION

The present invention generally relates to a new family of biodegradable, environmentally friendly poly(amino acid) polymers and copolymers, as well as, to new and improved methods for making them. More particularly, it relates to high molecular weight poly(amino acid) polymers and copolymer derivatives thereof useful in water treatment applications as coolants and the like. The copolymers are derivatized to incorporate pendant hydroxyl, ether, hydroxyalkoxyalkyl, hydroxyalkylaminoalkyl, carboxylate and phosphonate functionality.

Poly(amino acids) are generally known in this art. Polyaspartic acid is known to be biodegradable. However, some modified poly(amino acids) are not biodegradable. For example, a homopolymer of hyroxyethylaspartamide synthesized by reacting a polysuccinimide of aspartic acid with more than 100 mol % of 2-hydroxyethylamine is reported to not be enzymatically degradable. A crosslinked polyhydroxyethylglutamide prepared by reacting poly(L-2-hydroxyethylglutamide) with various amounts of a diaminododecane crosslinking agent is enzymatically degradable, with the rate of degradation increasing with increasing crosslinking density. However, the same linear non-crosslinked polymer is not enzymatically degradable in vivo or in vitro.

The biodegradability and chelating properties of partially derivatized polyaspartic acid have heretofore been unknown and no known method for predicting them have existed prior to this invention. The partially derivatized polyaspartic acid, i.e., aspartic acid containing copolymers, in accordance with this invention were unexpectedly discovered to be more biodegradable and much between scale inhibitors and corrosion inhibitors than both unmodified polyaspartic acid and 100% derivatized polyaspartic acid.

Methods for making poly(amino acid) polymers and copolymers are generally known. Polyaspartic acid is prepared by reacting maleic anhydride with ammonia. Alternatively, maleic anhydride may be reacted with alcohols to form a half ester, and thereafter, reacted with ammonia alone or in combination with amines. These methods are generally effective to prepare rather low molecular weight polymers of less than about 1000. Solid phase polymerization of aspartic acid alone or in the presence of acid catalysts has also been performed. Lower molecular weight materials having molecular weights of less than 50,000 are generally provided by these methods.

Previous efforts to provide sulfonic acid (e.g., taurine or sulfonomethylamine) functionality to aspartic acid polymers having included reacting the starting materials in a toxic, dimethylformamide solvent. The molecular weights of polymers produced in dimethylformamide solvents are generally very low, i.e., less than about 1000. These processes require the steps of removing toxic DMF and recovering product polymer using complicated and expensive procedures. Moreover, the prior art methods result in degradation of the polymer backbone so that the molecular weights of the resulting products are significantly less than the already low molecular weight starting materials.

SUMMARY OF THE INVENTION

Unexpectedly, in view of the foregoing, it has now been discovered that high molecular weight poly(amino acid) polymers and copolymers may be prepared which are non-toxic and biodegradable.

In an embodiment, the present invention provides new and improved polyaspartic acid and polyglutamic polymers having a weight average molecular weight of greater than or equal to 70,000. These polyaspartic acid and polyglutamic acid homopolymers are biodegradable and have molecular weights which are considerably higher than those obtained from prior art methods.

In an embodiment, the present invention provides a new and improved method for making higher molecular weight polyaspartic acid and polyglutamic acid polymers which comprises: admixing aspartic acid or glutamic acid with super polyphosphoric acid to form a reaction mixture;

heating the reaction mixture at elevated temperatures of from about 100° to about 200° C. and at reduced pressures to form a soft, semi-fluid reaction mixture;

stirring the semi-fluid reaction mixture;

heating the stirred semi-fluid reaction mixture at elevated temperatures of from about 130° to about 240° C. and at reduced pressures for a time sufficient to provide a polysuccinimide;

separating the polysuccinimide from the remaining portions of the reaction mixture; and thereafter, hydrolyzing the polysuccinimide to provide a polyaspartic acid or a polyglutamic acid polymer having a weight average molecular weight of greater than or equal to 70,000.

In an embodiment, the present invention provides new and improved high molecular weight lightly crosslinked polyaspartic acid and polyglutamic acid polymers having weight average molecular weights in excess of 100,000, in both water soluble and water insoluble forms. The lightly crosslinked polyaspartic acid and polyglutamic acid polymers may be prepared by reacting a corresponding polysuccinimide with a diamine or triamine crosslinking agent. Thereafter, the crosslinked polysuccinimides are hydrolyzed to convert any remaining succinimide groups to aspartic acid or glutamic acid groups to provide the crosslinked polyaspartic acid and polyglutamic acid polymers. The crosslinked poly(amino acid) homopolymers in accordance with this embodiment are represented at least by the following general isomeric structural formulas:

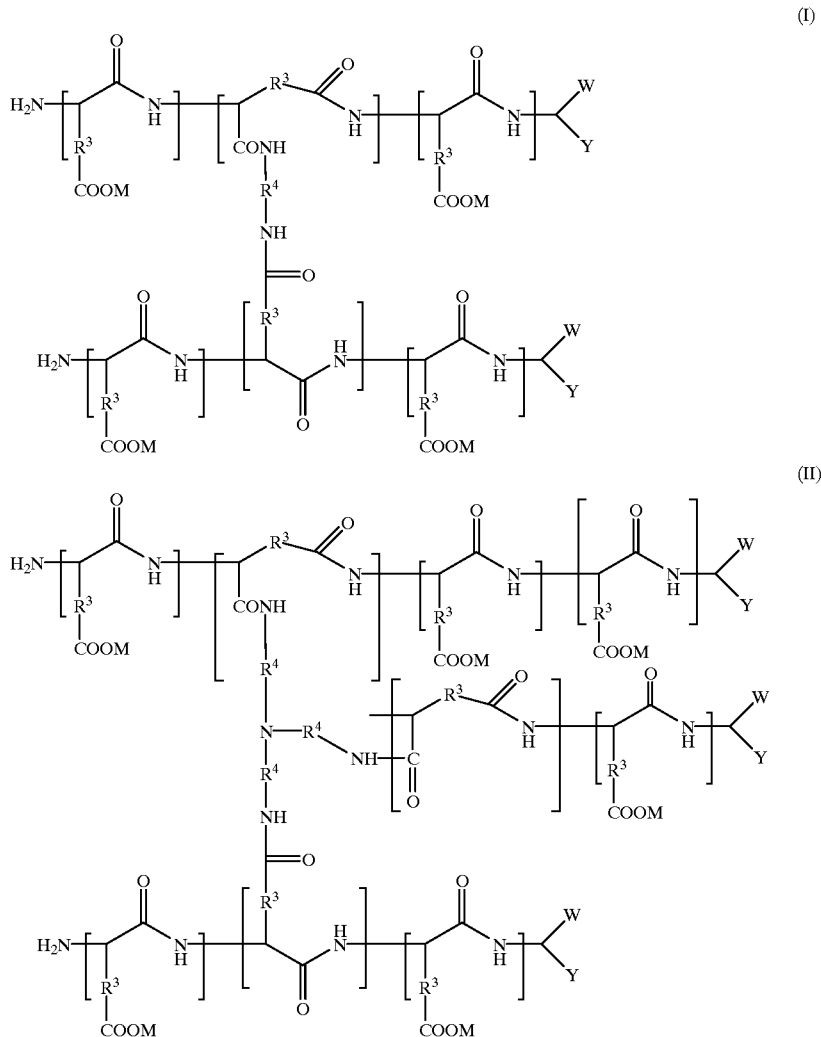

wherein M is a cation selected from the hydrogen, alkali metal, alkaline earth metal, ammonium or alkyl-substituted ammonium cations; $R^3$ is a divalent alkylene of 1 to 2 carbon atoms; $R^4$ is divalent alkylene of 1 to 12 carbon atoms, cycloalkyene, arylene, alkarylene, W is $CO_2M$; and $Y=R^3CO_2M$, said crosslinked polymer having a weight average molecular weight of greater than or equal to 100,000.

Preparation of these crosslinked poly(amine acids) in accordance with an embodiment comprises forming a solution of a high molecular weight polysuccinimide in an aqueous medium or in a polar organic solvent and adding a selected amount of a solution of crosslinker in water or in a polar organic solvent to form a reaction mixture. The reaction mixture is stirred at room temperatures for a time sufficient to form a crosslinked polysuccinimide. A less polar organic solvent is added to the reacted solution to precipitate crosslinked polysuccinimide product. The precipitated crosslinked product is separated, suspended in water and hydrolyzed to form the crosslinked poly(amino acid) final product.

In an embodiment, the present invention provides new and improved storage stable, substantially linear, biodegradable poly(amino acid) copolymers having a broad range of molecular weights. The new and improved copolymers comprise amino acid units of at least one amino acid or a salt thereof and derivatized units of at least one derivatized amino acid. The derivatized amino acid units include a substituent group selected from hydroxyamide, alkylolamide, arylolamide, hydroxyalkoxyalkylamide, alkoxyalkylamide, hydroxyalkylaminoalkylamide, N-(O-sulf)oxyalkylamide, N-(O-phospho)alkylamide, sulfonoalkylamide and phosphonoalkylamide groups. The copolymers may contain derivatized units which are all the same. The copolymers may also include a plurality of different derivatized units, so that copolymers, terpolymers and polypolymers may be provided. The amino acid units preferably comprise aspartic acid units, glutamic acid units or salt forms of these units.

In an embodiment, the new and improved derivatized poly(amino acid) copolymers, terpolymers and polypolymers in accordance with the invention generally comprise polymers of the formula:

(III)

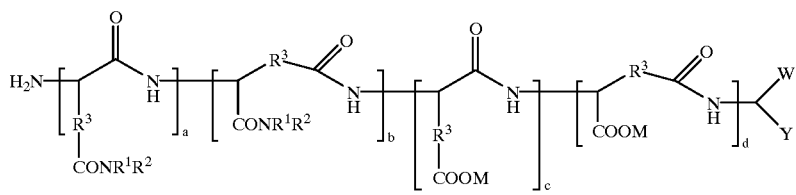

wherein $R^1$ is H or $C_1$–$C_4$ alkyl; $R^2$ is OH, ZOH, $ZOPO_3M_2$, $ZOSO_3M$, $ZOR^4$, or $GPO_3M_2$; $R^3$ is divalent alkylene having 1 to 2 carbon atoms; $R^4$ is $C_1$–$C_4$ alkyl or benzyl; Z is selected from $C_1$–$C_{12}$ alkyl, cycloalkyl and aryl, $CH_2CH_2$$(OCH_2CHR^5)_p(OCH_2CH_2)_q$, $CH_2CH_2(NR^5CH_2CHR^6)_r$ wherein p is 0 to 50, q is 0 to 50, p+=1 to 50, r is 1 to 50, $R^5$ is H or $CH_3$; $R^6$ is H or $CH_3$; G is selected from $C_1$–$C_{30}$ alkyl, cycloalkyl, alkenyl, aryl, alkaryl, aralkyl or any of the foregoing substituted with at least one group selected from OH, O-alkyl, Cl, Br, $CO_2M$, and $PO_3M_2$ groups; M is a cation selected from hydrogen, alkali metal, alkaline earth metal, ammonium and alkyl-substituted ammonium cations; W is selected from $CO_2M$ and $CONR^1R^2$; Y is selected $R^3CO_2M$ and $R^3CONR^1R^2$; a, b, c and d are mol percentages such that (a+b)/(a+b+c+d)=0.01% to 99.99%; a/(a+b)= 0.00 to 100.00%; b/(a+b)=0.00 to 100.00%; c/(c+d)=0.00 to 100.00%; d/(c+d)=0.00 to 100.00%; and a+b+c+d=100%. The new and improved polymers of the formula have weight average molecular weights of from about 500 to about 100,000.

In accordance with a preferred embodiment, biodegradable derivatized poly(amino acid) polymers are provided. The biodegradable copolymers, terpolymers and polypolymers are generally those defined by formula III above wherein the mol percentage ratio of (a+b)/(a+b+c+d) is from about 0.01 to about 50. For the N-alkylolaspartamide containing copolymers, terpolymers and polypolymers defined by the formula, i.e., those wherein $R^2$ is alkylol in at least some of the a and b derivatized units, the mol percentage of N-alkylolaspartamide units is preferably between 0.01 to about 30.0 to provide biodegradability.

In accordance with the present invention, in an embodiment, the new and improved derivatized poly(amino acid) copolymers, terpolymers and polypolymers may be prepared in aqueous media to provide complete derivatized polymers having a molecular weight which is the same or higher than the molecular weight of the starting materials. Generally, the derivatized polymers are prepared by reacting a polysuccinimide of aspartic acid or glutamic acid with the desired substituted amine derivatizing agent in aqueous medium to form a derivatized polysuccinimide. Thereafter, the derivatized polysuccinimide is hydrolyzed to convert any remaining underivatized succinimide units to aspartic acid or glutamic acid units to form the final product. Generally, the derivatizing reactions proceed at temperatures between –5° C. and 100° C. and at a pH of between about 3 to about 13. Specific conditions for derivatizing using each different type of derivatizing agent are provided in greater detail hereinafter. In addition, molecular weights of the derivatized copolymers may be varied as desired by varying or controlling the reaction temperature.

In a preferred embodiment, storage stable, high molecular weight derivatized polymers comprising N-hydroxyaspartamide derivatized units are provided. These derivatized polymers are prepared in aqueous media by reaction of hydroxyamide with a polysuccinimide. After derivatization is complete, the reaction mixture is treated to render any residual hydroxyamine present substantially non-reactive to prevent breakdown of the polymer backbone. The reaction mixture may be treated to inactivate residual hydroxyamine in a variety of ways, including by: dialysis; acidification to protonate the hydroxylamine; oxidation with an oxidizing agent, such as $Br_2$, $Cl_2$, $I_2$, ester, amide or acyl chloride; and by evaporating the solution to dryness.

An advantage of the present invention is that a new family of biodegradable derivatized polyamino acid polymers containing hydroxyl, ether, hydroxyalkyl, hydroxyalkoxyalkyl, hydroxyalkylamino, carboxylic and/or phosphonic functionalities are provided.

Another advantage provided by the present invention is that relatively high molecular weight poly(amino acid) homopolymers are provided.

A further advantage of the present invention is that derivatized poly(amino acid) polymers of varying molecular weights may now be synthesized in aqueous media. The methods are less expensive and do not require additional complicated and expensive steps to recover the products. Toxic organic solvents such as dimethylformamide no longer need to be used.

Still another advantage provided by this invention is that relatively high molecular weight derivatized poly(amino acid) polymers are provided which are storage stable and biodegradable.

A further advantage provided by this present invention is that desired low or high molecular weight derivatized poly (amino acid) polymers are provided by controlling the derivatizing reaction temperature.

Still another advantage provided by this invention is that high molecular weight, storage stable, derivatized poly (amino acid) polymers containing N-hydroxy amino acid amide derivatized units are provided.

A further advantage of this invention is that it provides a new family of poly(amino acid) polymers and derivatized polymers which are non-toxic and biodegradable which may be used in water treating applications to replace the toxic and non-biodegradable acrylic- and acrylamide-based products currently being used.

Other objects and advantages of the present invention will be apparent from the followings Detailed Description of the Invention and illustrative working Examples.

DETAILED DESCRIPTION OF THE INVENTION

In accordance with a first aspect, the present invention provides a new and improved method for making relatively high molecular weight, substantially linear poly(amino acid) homopolymers. The polymers have weight average molecular weights in excess of 70,000, preferably above 90,000.

The method comprises forming a mixture of an amino acid, preferably L-aspartic acid or L-glutamic acid, with about one equivalent of super polyphosphoric acid. The mixture is heated at temperatures of about 100 to 200° C. preferably at 150° C., and at reduced pressures of less than or equal to 0.1 mm Hg, until a soft semi-fluid mixture is obtained. The softened mixture is thoroughly stirred and mixed. The resulting paste is heated at temperatures of about 130° C. to about 250° C., preferably 150 to 227° C. and at reduced pressures of less than or equal to 0.1 mm Hg, for a time sufficient to provide a relatively high molecular weight polysuccinimide product. Heating times of from about 3 to 6 hours, preferably about 4.5 hours, are usually sufficient. If desired, the crude product may be ground in a grinder, and the finely divided ground product can be further heated in a vacuum oven at temperatures of about 125 to 200° C., preferably 150° C., for 2 to 5 hours, preferably about 3.5 hours, to provide a polysuccinimide of even higher molecular weight.

The crude products and re-heated products are each recovered by washing with water or by first dissolving the products in a polar organic solvents such as dimethylformamide at temperatures of between about 50 to 100° C., preferably 50–75° C., to form a solution. The solution is poured into deionized water to precipitate the polysuccinimide. The precipitate may thereafter be filtered, washed with deionized water and dried to provide purified polysuccinimide product. The purified polysuccinimide products may be used to form derivatized copolymers, terpolymers and polypolymers in accordance with a preferred embodiment. The crude and reheated polysuccinimides containing phosphoric acid can also be used without purification for reactor with substituted amines to form copolymers, terpolymers and polypolymers.

The corresponding poly(amino acids) polymers are prepared by suspending the polysuccinimide products in water and hydrolyzing by dropwise addition of approximately one equivalent of sodium hydroxide at a pH of less than or equal to 11.0. The final resulting solution of polyaspartic acid or polyglutamic acid in water has a pH of between 7 and 9. A mineral acid, such as HCl or $H_2SO_4$, may be added if necessary to neutralize any excess remaining NaOH. The polymers prepared by this method have weight average molecular weight above 70,000, usually above 90,000.

In accordance with another embodiment, higher molecular weight poly(amino acid) polymers are provided in the form water soluble and water insoluble crosslinked poly (amino acid) polymers. In accordance with tis embodiment, a polysuccinimide of D-, L-, or D,L-aspartic or glutamic acids is provided in suspension in water or alkanol, or in solution with a polar organic solvent such as anhydrous dimethylformamide. A solution of an alkylene diamine crosslinker or a tris(aminoalkyl)amine crosslinker in water or a polar organic solvent, such as dimethylformamide or alcohol, is added to the polysuccinimide solution to form a reaction mixture. The reaction mixture is stirred in a closed vessel for a time sufficient to permit crosslinking to occur. Usually, a crosslinking reaction time of from about 5 to about 10 hours, preferably 7.5 hours, is sufficient. A less polar solvent, such as a mixture of ethanol and cyclohexane, is prepared and added to the reaction mixture to precipitate crosslinked polysuccinimide product. The precipitate is filtered, washed and dried to provide a purified crosslinked polysuccinimide product having a molecular weight in excess of 100,000.

The corresponding crosslinked poly(amino acid) is prepared by suspending the solid crosslinked polysuccinimide product in deionized water and hydrolyzing at room temperature with NaOH to form the corresponding polyaspartic acid or polyglutamic acid product. The final solution pH may be adjusted from about 11.0 to between 6 and 9 with acid such as hydrochloric acid or sulfuric acid.

The crosslinked poly(amino acids) have weight average molecular weights in excess of 100,000 and are shown by formulas I and II above.

The crosslinking agents may comprise an alkylene diamine or a tris(aminoalkyl)amine or a tetra(aminoalkyl) amide. Illustrative examples of alkylenediamine crosslinkers which may be used include ethylenediamine, propylenediamine, butylenediamine, hexylenediamine and the like, and 1,6-hexanediamine is preferred. Illustrative tris(aminoalkyl)amine crosslinkers include tris(2-aminoethyl)amine, tris(3-aminopropyl) amine, tris(4-aminobutyl)amine, tris(6-aminohexyl)amine, and the like with tris(2-aminoethyl)amine being preferred. Generally, water soluble crosslinked poly(amino acids) may be prepared using 0.01 to about 1.5% by weight of crosslinker based upon the weight of the polysuccinimide. Water insoluble crosslinked poly(amino acids) are prepared using higher amounts of crosslinker based on the weight of the polysuccinimide.

In a preferred embodiment, the present invention provides substantially linear derivatized poly(amino acid) copolymers, terpolymers and polypolymers having the formula III above. The derivatized poly(amino acid) polymers have a substantially linear polymer backbone comprising amino acid units and derivatized amino acid units. The derivatized units are amino acid units derivatized so that they include hydroxyamide groups, alkylolamide groups, arylolamide groups, hydroxyalkoxyalkylamide groups, alkoxyalkylamide groups, hydroxyalkoxyaminoalkylamide groups, sulfonoalkylamide groups and/or phosphonoalkylamide groups. The derivatized poly(amino acids) may comprise derivatized units which are all the same or they may contain a plurality of different derivatized units. For example, the polymers may comprise N-hydroxy amino acid amide derivative units alone or in combination with one or more N-alkylol amino acid amide derivatized units. The polymers may comprise N-hydroxy amino acid amide units, one or more N-alkylol amino acid amide units, and one or more N-sulfonalkyl amino acid amide units. N-phosphonoalkyl amino acid amide units or alkylamide units. Illustrative copolymers in accordance with formula II may include: N-hydroxyaspartamide/aspartic acid copolymer, N-hydroxyethylaspartamide/aspartic acid copolymer, N-(2-methyl-1,3-dihydroxypropyl) aspartamide/aspartic acid copolymer, N-2-(2-hydroxyethoxy) ethylaspartamide/aspartic acid copolymer, N-2-methoxyethylaspartamide/aspartic acid copolymer, N-2-(2-hydroxyethylamino)ethylaspartamide/aspartic acid copolymer, N-phosphonomethylaspartamide/aspartic acid copolymer and N-2-sulfonoethylaspartamide/aspartic acid copolymer, to name but a few. Corresponding copolymers based on glutamic acid, instead of aspartic acid, are also contemplated.

Illustrative terpolymers in accordance with formula III may include: N-hydroxyaspartamide/N-2-hydroxyethylaspartamide/aspartic acid terpolymer, N-2 - hydroxyethylaspartamide/N-phosphonoethylaspartamide/ aspartic acid terpolymer, N-(2-methyl-1,3-dihydroxypropyl) aspartamide/N-2-sulfonoethylaspartamide/aspartic acid terpolymer and N-hydroxyaspartamide/N-phosphonomethylaspartamide/aspartic acid terpolymer, N-2-hydroxyethylaspartamide/N-butylaspartamide/aspartic acid terpolymer, and N-2-(2-hydroxyethoxy) ethylaspartamide/N-2-hydroxyethylaspartamide/aspartic acid terpolymer, to name but a few of the possible combinations.

Illustrative polypolymers may include: N-hydroxyaspartamide/N-2-hydroxyethylaspartamide/N-phosphonomethylaspartamide/aspartic acid and N-hydroxyaspartamide/N-2-hydroxyethylaspartamide/N-2-sulfonoethylaspartamide/aspartic acid to name but a few.

In a preferred embodiment, the new and improved derivatized poly(amino acid) polymers are biodegradable. In accordance with this aspect, the mol percentage of derivatized units incorporated in the polymers is generally from about 0.01 to about 50 mol %. For the N-alkylol amino acid amide containing polymers, the mol percentage of N-alkylol amino acid amide derivatized units should be between 0.01 and 30 mol % to provide complete biodegradability. Variations in the mol percentages of the derivatized units may vary from the above-described ranges and still provide biodegradability.

In accordance with an embodiment, the new and improved derivatized poly(amino acid) polymers defined in formula III above may be prepared by a number of methods. These methods generally include the steps of providing a polysuccinimide of D-, L- or, D,L-aspartic acid or glutamic acid, and thereafter, derivatizing it be reacting it with a substituted amine derivatizing agent.

The polysuccinimide starting materials may be prepared by various methods. Low molecular weight polysuccinimides having weight average molecular weights of less than 5,000 may be prepared in accordance with known methods by reaction of maleic anhydride with one equivalent of ammonium hydroxide in water at temperatures of between about 20° C. and 85° C. for a period of 2 to 6 hours. The product may be obtained on evaporation of the solvent and heating to temperatures of from about 150° to 300° C., preferably 180° to 240° C., leaving polysuccinimide solids. These polysuccinimides may also be prepared with maleic acid and ammonium or from mono- or di-ammonium maleate. Low molecular weight polysuccinimides may also be prepared by heating aspartic acid without an acid catalyst.

Slightly higher molecular weight polysuccinimides having weight average molecular weights of between about 20,000 to about 60,000 may be prepared in accordance with known methods by heating the amino acid in the presence of an acid catalyst selected from O-phosphoric, polyphosphoric, phosphonic, and phosphorus pentaoxide.

Preferably, the polysuccinimide starting materials will comprise the higher molecular weight polysuccinimides, i.e., those having weight average molecular weight of greater than or equal to 70,000 prepared in accordance with the present invention, using a super polyphosphoric acid catalyst as described above.

In accordance with a preferred embodiment, the polysuccinimides are derivatized in an aqueous reaction medium. The reaction of the polysuccinimide and derivatizing agent in water does not, or does not severely, degrade the polymer backbone and provides derivatized polymer products having a molecular weight generally equal to or greater than the polysuccinimide staring material.

More particularly, the present invention provides new and improved derivatized poly(amino acid) polymer derivatized to contain N-phosphonoalkyl amino acid amide derivative units. These derivatized amino acid polymers may be prepared in at least two ways. The first method, which is preferred comprises suspending a polysuccinimide in water and adding an aqueous solution of sodium aminoalkylphosphonate to form a reaction mixture. The reaction mixture is stirred at room temperature for a time sufficient to permit derivatization to be substantially complete. A reaction time of between about 10 to 15 hours is usually sufficient. Alternatively, an aqueous solution of an aminoalkylphosphonic acid derivatizing agent together with trimethylamine may be added to the suspension to provide derivatized product. The N-phosphonoalkyl amino acid amide/polysuccinimide product is hydrolyzed with sodium hydroxide to form the described N-phosphonoalkyl amino acid amide/amino acid derivatized polymer.

In accordance with another method, a solution of dipotassium aminoalkylphosphonate and a 4-N,N-dimethylpyridine catalyst in anhydrous alkanol, such as ethanol, is added to a solution of polysuccinimide in dimethylformamide to form a reaction mixture. The reaction mixture is stirred at room temperature for 4 to 100 hours, preferably for about 5 to about 10 hours. The resulting solids are filtered, washed and dried. The solids are dissolved in water and residual succinimide is hydrolyzed to amino acid with base to provide the N-phosphonoalkyl amino acid amide/amino acid derivatized polymer.

In accordance with these methods, the derivatizing agents for incorporating N-phosphonoalkyl amino acid amide derivatized units may include aminomethylphosphonic acid or its dipotassium salt. Other derivatizing agents of this type may include:

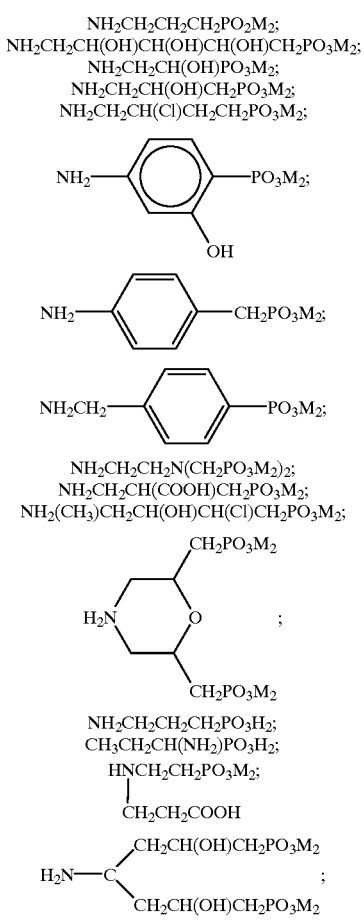

In an embodiment, the present invention provides a new and improved derivatized poly(amino acid) polymers derivatized to contain N-sulfonoalkyl amino acid amide derivatized units. These derivatized amino acid polymers may be prepared in aqueous media in substantially the same manner as the N-phosphonoalkyl amino acid amide-containing derivatized polymers described above. These polymers may also be prepared by reacting an aqueous suspension of polysuccinimide with an aminoalkylsulfonic acid or salt as the derivatizing agent. Additional details of this method are provided in Examples provided below.

Illustrative derivatizing agents for these polymers include sodium taurate and aminomethylsulfonic acid. Other sulfonic acid or acid salt containing derivatizing agents which may be used herein may include:

$NH_2CH_2CH(OH)CH(OH)CH(OH)CH_2SO_3M$;
$NH_2CH_2CH(OH)SO_3M$;
$NH_2CH_2CH(OH)CH_2SO_3M$;
$NH_2CH_2CH(Cl)CH_2CH_2SO_3M$;

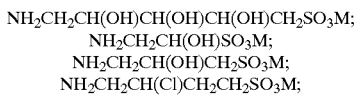

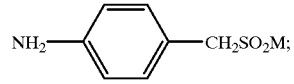

$NH_2CH_2CH_2CH_2N(CH_2SO_3M)_2$;
$NH_2CH_2CH(COOH)CH_2SO_3M$;
$NH_2(CH_3)CH_2CH(OH)CH(Cl)CH_2SO_3M$;

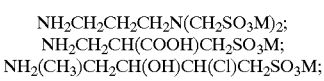

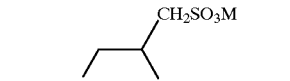

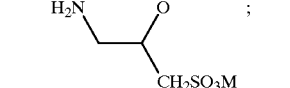

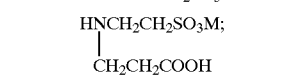

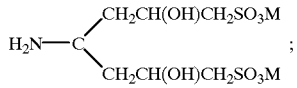

In an embodiment, the present invention provides new and improved derivatized poly amino acid polymers derivatized to contain N-alkylol amino acid amide derivatized units, N-hydroxyalkoxyalkyl amino acid amide derivatized units, N-alkoxyalkyl amino acid amide derivatized units and/or N-hydroxyalkylaminoalkyl amino acid amide derivatized units. These derivatized amino acid polymers may also be prepared in aqueous media in accordance with the above described methods or in a polar organic solvent, such as dimethylformamide in accordance with methods described above.

Illustrative derivatizing agents for making the N-alkylol amino acid amide containing polymers include: 2-hydroxyethylamine; 3-hydroxypropylamine; 2-hydroxyisopropylamine; 2-amino-2-methyl-1,3-propanediol; 2,3-dihydroxypropylamine; 2-hydroxymethyl-1,3-dihydroxypropylamine; N,N-bis(hydroxyethyl)amine; o-, m- or p-phenolamine; and dihydroxyphenolamine, to name but a few. Further details for making these derivatized poly(amino acid) polymers are set forth in the Examples provided hereinafter.

Illustrative derivatizing agents for making the N-hydroxyalkyl or N-alkoxyalkyl amino acid amide containing polymers include: 2-(2-hydroxyethoxy)ethylamine (also known as, 2-(2-aminoethoxy)ethanol), 2-methoxyethylamine and 3-methoxypropylamine, to name but a few.

Illustrative derivatizing agents for making N-hydroxyalkylaminoalkyl amino acid amide containing polymers include: 2-(2-hydroxyethylamino)ethylamine and 2-(3-hydroxypropylamino)ethylamine, to name but a few.

In an embodiment, the present invention provides new and improved derivatized poly amino acid polymers derivatized to contain N-hydroxy amino acid amide derivatized units and/or N-alkyl-N-hydroxy amino acid amide derivatized units. These derivatives amino acid polymers may also be prepared in aqueous media in accordance with the present invention. In accordance with this method, the derivatizing agent used is an aqueous solution of an hydroxylamine acid complex in deionized water with sodium hydroxide added to provide a solution pH of between 4.0 and 11.0, preferably between 6.0 and 9.0. The derivatizing agent is added to an aqueous suspension of polysuccinimide to form a reaction mixture. The reaction mixture is stirred at temperatures of between about $-5°$ C. to about $100°$ C., preferably between $10°$ to $60°$ C., for a period of from 20 to 35 hours or until the derivatization reaction is substantially complete. The residual succinimide units are hydrolyzed by raising the pH above 9.00 with stirring for a period of from 1 to about 2 hours. Thereafter, the pH is adjusted to between 7.0 and 8.0 to provide an N-hydroxy amino acid amide derivatized poly amino acid polymer product.

Residual hydroxylamine and/or N-alkylhydroxylamine present in the polymer products is highly reactive and tends to degrade the polymer backbone resulting in polymers having undesirably low molecular weight.

In accordance with the method of the present invention, the reaction product is treated to render unreacted hydroxylamine or N-alkylhydroxylamine present in the final product solution substantially non-reactive to provide storage stable higher molecular weight derivatized polymers. The treating steps may comprise acidifying the reaction product solution to an acidic pH with an aqueous mineral acid to protonate residual hydroxylamine. Preferably, hydrochloric acid or sulfuric acid is added until a pH of below 4.0, preferably below 3.5, in the reaction product solution is achieved.

An alternative treating step in accordance with this aspect of the invention is to dialyze the reaction product solution against deionized water until residual hydroxylamine is substantially removed. Usually, dialysis for a period of from about 5 to about 60 hours is sufficient using MWCO 100–1000 grade dialysis membranes.

Another method for removing residual hydroxyamide comprises treating the reaction product with a strong oxidizing agent, such as $I_2$, $Br_2$, $Cl_2$, or with an ester, amide, acyl halide or the like. The reaction product may be acidified to a pH of less than 3.0 prior to addition of the oxidizing agent, or the oxidizing agent may be added to the solution at an initial pH of between 7.0 and 8.0. After $I_2$ addition, the pH of the solution falls rapidly and significantly, i.e., from 7.2 to 2.9 in one minute.

Another treating method includes the step of evaporating the final product solution to dryness which prevents degradative action by the residual hydroxylamine.

In accordance with this method, any other compound or molecule reactive with hydroxylamine, N-alkylhydroxylamine, or their salts, but substantially non-reactive with the copolymer, may also be used as an inactivating agent. When residual hydroxylamine is consumed by the reaction, the polymer product will be stable. Other inactivating agents which can be used for this purpose include esters, preferably water soluble esters, such as glycol formate and glycol acetate. Other inactivating agents may include acyl chlorides, aldehydes, ketones and amides which can react with residual hydroxylamine or N-alkylhydroxylamine to form non-reactive hydroxyamic acids. Other inactivating agents can also include aldehydes and ketones which can react easily with residual hydroxylamine or N-alkylhydroxlamine to form non-reactive oximes (NOH=CR'CR"). These additional reagents and methods can also be used to stabilize the N-hydroxy amine acid amide derivatized amine acid polymer products in accordance with this invention.

In accordance with a preferred embodiment, the weight average molecular weight of the derivatized poly (amine acid) polymers may be selectively controlled, in accordance with an aspect of the invention, by reacting the polysuccinimide at controlled temperatures and/or controlled reaction times in a polar organic solvent, such as dimethylformamide, dimethylsulfoxide and the like, with a derivatizing agent selected from alkylolamines, arylolamines, hydroxyalkylalkoxyamines, alkoxyalkylamines, hydroxyalkylaminoalkylamines and phosphonoalkylamines.

In accordance with this aspect of the invention, when the molecular weight of the starting polysuccinimide is fixed, the molecular weight of the derivatized polymers decreases as the reaction temperature increases, and as the reaction time at that temperature increases. In accordance with the invention, the molecular weight of the derivatized poly (amino acid) polymers can be predicted or designed based on the proper selection of a polysuccinimide starting material and by selecting and controlling the reaction temperature and the reaction time for the derivatization reaction. Accordingly, desired molecular weights for the derivatized polymers may now be predicted and obtained. Importantly, the molecular weights of the copolymers, terpolymers and poly polymers are not affected by the subsequent hydrolysis reaction to convert succinimide residues to acid units or by the remaining succinimide units.

Additional details with respect to the polymers and methods for making them are provided in the following illustrative Working Examples.

DESCRIPTION OF THE PREFERRED EMBODIMENTS

Preparation 1
Synthesis of Low MW Poly (succinimide) from Maleic Anhydride and Ammonium Hydroxide A slurry of maleic anhydride (196 g, 2 mol) in DI water (400 g) was magnetically stirred and heated to 75° C. The resultant clean solution was cooled to about 20° C. and 30% ammonium hydroxide (136 g, 2 mol) was added dropwise. After addition of ammonium hydroxide was complete, the solution was further stirred at 20° for 45 min. and at 83° C. for 3.5 hours. The resultant clear solution weighed 539 grams and was divided into two parts, A and B. Part A of the solution was transferred to a crystallization dish (100×170 mm) and was heated to 150° C. in a vacuum oven at $\leqq 0.1$ mm Hg. Water was removed over 1 hours. The resultant white solids were further heated at 150–180° C./$\leqq 0.1$ mm Hg for 30 min. and at 180° C./$\leqq 0.1$ mm Hg for 3.5 hours to afford brittle, orange poly(succinimide) solids (83.1 g, 84.8%) with a few grams of white solids (probably maleic anhydride) deposited on the window glass of vacuum oven. The poly(succinimide) of Preparation 1 was soluble in dimethylformamide (DMF) but insoluble in tetrahydrofuran (THF). IR (pellet): 1705 (s) and 1792 (vw) cm$^{-1}$ which are characteristic absorptions of cyclic imide of poly (succinimide).

Preparation 2

Part B of the solution of Preparation 1 was heated in a two-necked flask with a flow of nitrogen in an oil bath at 120–140° C. Water was removed over 1.5 hours. The residual solids were further heated with a nitrogen flow at 130–140° C. for 8.5 hour. The resultant brittle orange solids weighed 122.8 g (probably a mixture of poly(succinimide) oligomers and monoammonium maleate). This product was not soluble in either THF or DMF.

Preparations 3–5
Synthesis of Low MW Poly (aspartic acid) by Hydrolysis of Poly(succinimide)

Preparation 3

A low molecular weight poly(aspartic acid) was prepared as follows: 10.0% NaOH solution (12.1 g, 0.0303 mol) was added dropwise to a suspension (pH=3.0) of the poly (succinimide) of Preparation 1 (5.0 g, 0.051 mol) in DI water (72 g) at 73° C. at pH value of 3.0 to 7.2 over 18 min. to afford a red solution. The resultant solution was diluted with DI water to 100.0 grams. IR (solution): 1720 (s), 1574 (s), 1394 (s) cm$^{-1}$. The MW and polymer active determined by GPC are summarized in Table 1. The product was stored in a refrigerator.

Preparation 4

The poly(succinimide) of Preparation 2 was heated at 180–200° C./$\leqq 0.1$ mm Hg for 5.5 hours. 50 g (0.51 mol) of this poly(succinimide) was suspended in DI water (400 g) and a 50% NaOH solution (40.0 g, 0.51 mol) was added at room temperature over 1 hours. The pH value was 12.48 as the last drop of NaOH solution was added and did not change over an extended 40 minutes stirring at room temperature. Thereafter, the pH value was adjusted to 8.6 with dilute hydrochloric acid (0.098 mol). The resultant red solution weighed 679.7 grams and was kept in a refrigerator. The pH value of the solution did not change within 4 days but dropped to 7.63 over 39 days. IR (solution): 1712 (vw), 1632 (should, m), 1577 (s) and 1395 (s). The MW and polymer concentration determined by GPC are summarized in Table 1.

Preparation 5
Synthesis of Intermediate MW Poly(succinimide) Using o-Phosphoric Acid Catalyst L-aspartic acid (100 g, 0.752 mol) and 85% o-phosphoric acid (43.3 g, 0.376 mol, 0.5 equivalent) were mixed with a spatula in a crystallization dish (170×100 mm) and evenly distributed as a paste in the bottom of the dish. An aluminum foil with small holes was placed on the top of the dish. The dish was then placed in a vacuum oven and heated at 60–180° C./house vacuum (about 100 mm Hg) for 2.5 hours to form brittle, white foam which was removed immediately from the oven and cooled inside a hood. The crude solid poly(succinimide) was dissolved in DMF (350 ml) at 80° C. and the DMF solution was poured with stirring into DI water (2.5 L) in a 3 L beaker to form small pieces of white precipitate. The precipitate was collected by vacuum filtration and washed with DI water 10 times (300–400 ml×10) until the filtrate reached a pH value of 3.6. The wet solids were dried at about 100° C./house vacuum for 20 hours to afford white solid poly(succinimide) (61.0 g, 83.1%).

Preparation 6

A suspension of the poly(succinimide) of Preparation 6 (5.0 g, 0.051 mol) in DI water (50 g) was heated to 83° C. To this was added dropwise a NaOH solution (4.1 g of 505 NaOH diluted with 30 g of DI water, 0.051 mol) over 25 min. at a pH≦10.4. The resultant solution had a final pH value of 7.9 and weighed 72.7 grams. The MW and polymer concentration determined by GPC is summarized in Table 1.

Preparation 7

A mixed paste of L-aspartic acid (75.0 g, 0564 mol) and 85% o-phosphoric acid (37.5 g, 0.325 mol, 0.58 equivalent) in a crystallization dish (170×100 mm) with an aluminum foil with holes in the top was heated in a vacuum oven to 145° C./≦5 mm Hg over 75 minutes and further heated at 145–184° C./≦5 mm Hg for 2.0 hours. The resultant crude, poly(succinimide) solids were cooled within the oven to room temperature and then scratched off the dish. The solids were dissolved in DMF (850 ml) at 80° C. The DMF solution was concentrated at 70–90° C./≦40 mm Hg to about 300 ml and poured into DI water (1.5 L). The resultant white precipitate was collected by vacuum filtration, washed with DI water (300 ml×7) and dried at 120–140° C./house vacuum for 14 hours, and at 70–90° C./house vacuum for 37 hours. The dry solid poly(succinimide) weighed 54.5 g (99.5%). IR (KBr pellet): 1803 (w), 1713 (s), 1635 (sh), 1397 (s), 1360 (s), 1216 (s) and 1162 (s).

Preparation 8

To a suspension of the poly(succinimide) of Preparation 8 (5.0 g, 0.051 mol) in DI water (75 g) at 70° C. was added 10.0% NaOH solution (19.8 g, 0.049 mol) at a rate of 14 to 17 ml/h. to control the pH value ≦11.9. The pH value of the resultant solution was adjusted to 8.4 and the solution was diluted with DI water to 100.0 grams. The product was kept in a refrigerator. IR (solution): 1636 (m), 1576 (s), 1395 (s), 1101 (m). The MW and polymer concentration determined by GPC are summarized in Table 1.

Preparation 9

Another poly(aspartic acid) was similarly synthesized from hydrolysis of the poly(succinimide) of Preparation 8 at 50–60° C. but excess NaOH was added. The pH value of the solution was immediately adjusted with dilute sulfuric acid to 8–9. The MW and polymer concentration are summarized in Table 1.

Preparation 10

A mixture of L-aspartic acid (75.0 g) and orthophosphoric acid (37.5 g) in a crystallization oven was heated under vacuum of ≦5 mm Hg to 145° C. over 75 min., and thereafter, heated to 145 to 184° C./≦5 mm Hg for 2.5 hours. The crude poly(succinimide) was purified and subsequently hydrolyzed to poly(sodium aspartate) having a weight average molecular weight of 66,000.

Preparation 11

Synthesis of Super Polyphosphoric Acid Catalyst

A super polyphosphoric acid catalyst was prepared in accordance with Fieser, M., Ed. Reagents for Organic Synthesis, Vol 5, pp 540, John Wiley & Son, New York, as follows: a premixed paste of Polyphosphoric acid (670 g) and Phosphorus pentoxide (130.8 g) in a 1000 ml-jar equipped with a mechanic stirrer was heated with a strong nitrogen stream to 140° C. over 30 minutes to form a fluid sufficiently soft to be mechanically stirred. The fluid was then heated with stirring to 175° C. over 1 hour and further heated at 175–190° C. for 2.0 hours to afford 761.8 g of a tacky fluid.

EXAMPLE 1

A mixture of L-aspartic acid (75.0 g, 0564 mol) and super PPA (48.0 g, about 1 equivalent) were added into a crystallization dish (170×100 mm). The dish with a holed aluminum foil on the top was placed into a vacuum oven and heated to 300° F. (150° C., outer temperature, not reactant temperature) at ≦0.1 mmHg to form a soft semi-fluid. The oven was opened and the reactants were quickly mixed with a spatula. The paste was then heated in the same oven at 300–400° F. (150–227° C.)/≦0.1 mm Hg for 4.5 hours. The crude product was cooled to room temperature inside the oven and divided into two parts (A and B). Part A (21.0 g) of the crude product was dissolved in DMF (200 ml) at 60° C. The DMF solution was concentrated at 60° C./1 mm Hg to 120 ml and then poured to DI water (300 ml). The resultant precipitate was collected by vacuum filtration, washed with DI water (200 ml×6) and dried at 160° C./≦0.1 mm Hg for 1 hour and at 120° C./house vacuum for 48 hours to afford 11.1 g of pure, white solid poly(succinimide).

EXAMPLE 2

Part B (72.8 g) of the above crude product was ground (twice using 5 and 0.5 mm grinders, respectively). 67.0 g of the ground crude poly(succinimide) was heated in a vacuum oven (pre-heated to 180° C.) at 180° C./≦0.1 mm Hg for 3.5 hours to give 62.8 g of crude poly(succinimide) D. 33.0 g of crude poly(succinimide) D was dissolved in DMF (300 ml) at 60–70° C. The DMF solution was poured to DI water (1000 ml). The precipitate was collected by filtration, washed with DI water (400 ml×7) and dried at 150–160° C./≦0.1 mm Hg for 1 hour and at 120° C./wall vacuum for 62 hours to give pure, dirty white solid poly(succinimide) (18.3 g).

EXAMPLE 3

The rest of crude poly(succinimide) D (29.8 g) was ground to ≦0.5 mm and heated at 180–200° C./≦0.1 mm Hg for 4.5 hours and purified using the procedure as mentioned earlier to give 14.7 g of light grey, pure poly(succinimide).

EXAMPLES 4–7

Following the procedure of Preparation 10, the poly (succinimides) of Examples 1–3 were hydrolyzed to form the poly(aspartic acids) polymers identified as Examples 4–6, respectively. IR (solution) of Example 5: 1638 (m), 1575 (s), 1396 (s). The MWs and polymer concentrations determined by GPC for Examples 4–6 are summarized in Table 1.

Another poly(aspartic acid) polymer was prepared from L-aspartic acid and super polyphosphoric acid following the procedures of Examples 1–3. A corresponding poly(aspartic acid) identified as Example 7 was prepared in accordance with the methods of Examples 4–6.

EXAMPLE 8

A mixture of L-aspartic acid (75.0 g) and super polyphosphoric acid (48.0 g) in a crystallization dish was heated in an oven under vacuum ($\leq 0.1$ mm Hg) to 150° C. over 30 min. and was further heated at 150 to 227°/$\leq 0.1$ mm Hg) for 4.5 hours. The solid products was cooled to room temperature. 21.0 g of this solid were dissolved in DMF, precipitated with water, washed with water and dried to give pure poly (succinimide). A pure poly(succinimide) was subsequently hydrolyzed with sodium hydroxide to afford a poly(sodium aspartate) of weight average molecular weight 80,000. The remaining portion of the unpurified poly(succinimide) (67.0 g) was ground to fine particles ($\leq 0.5$ mm) and reheated at 180–190° C./$\leq 0.1$ mm Hg for 3.5 hours to provide a new solid. 33 g of the new solid was purified by the above method and subsequently hydrolyzed to afford a poly (sodium aspartate) having a weight average molecular weight of 94,000.

EXAMPLE 9

To a solution of the poly(succinimide) of Example 3 (1.23 g, 0.0125 mol) in dry DMF (20 ml, dried with activated 4 Å MS) was added 3.0 g of a solution of 0.040% 1,6-hexanediamine (0.10 wt %) in dry DMF. The mixture was stirred in a closed glass jar at room temperature for 7.5 hours. 150 mL of a mixed solvent (ethanol:cyclohexane= 1:2) was added to the DMF solution. The resultant precipitate was filtered, washed with the mixed solvent and dried at 60° C./$\leq 0.1$ mm Hg for 4 hours to afford 1.24 g (100% of a water insoluble, lightly cross-linked poly(succinimide) solid. The solid was suspended in DI water (77 g) and hydrolyzed at room temperature with 10.0% of NaOH solution (4.90 g) over 75 min. The final solution pH value was adjusted with dilute hydrochloric acid from 13.10 to 6.83. The MW of the water soluble, lightly cross-linked poly(aspartic acid) is set forth in Table 1.

EXAMPLE 10

To a solution of poly(succinimide) (1.23 g) in DMF (20 g) was added to the solution of 1,6-diaminohexane (3.0 g of 0.040% solution in DMF). After the solution was stirred at room temperature for 7.3 hours, 150 mL of a mixed solvent (ethanol:cyclohexane, 1:2) was added. The resultant precipitate was filtered, washed with washing solvent, dried at 60° C. under vacuum and hydrolyzed with 10% NaOH (4.9 g) to provide a water soluble, lightly crosslinked, poly(sodium aspartate) having a weight average molecular weight of 104,000.

EXAMPLE 11

Another water soluble, lightly crosslinked poly(sodium aspartate) was synthesized in accordance with the method of Examples 9–10, except that the 1,6-hexane-diamine crosslinker was replaced with a tris(2-amino-ethyl)amine crosslinker.

EXAMPLE 12

To a solution of poly(succinimide) (1.23 g) in DMF (15 g) was added a solution of tris(aminoethyl)amine (3.0 g of 0.040% solution in DMF). After the solution was stirred at room temperature for 7.3 hours, 150 mL of a mixed solvent (ethanol:cyclohexane, 1.2) was added. The resultant precipitation was filtered, washed with washing solvent, dried at 60° C. under vacuum and hydrolyzed with 10% of NaOH (4.90 g) to yield a water soluble, lightly crosslinked poly (sodium aspartate) having a weight average molecular weight of 114,000.

EXAMPLE 13

To a solution of the poly(succinimide) of Example 3 (1.23 g, 0.0125 mol) in dry DMF was added 1,6-diaminohexane (0.03 g, 2.4 wt % of poly(succinimide)). The solution was stirred in a closed glass vessel at room temperature over night to form a gel. The gel was stirred with ethanol (30 ml) to dissolve the DMF. The solution was decanted and the gel was dried at 50 to 70° C./$\leq 0.1$ mm Hg for 1 h. to give 1.57 of a brownish, cross-linked poly(succinimide) solid. The solid was ground to $\leq 0.5$ mm and suspended in DI water (34 g). To this suspension was added 3.80 g (0.00950 mol) of 10.0% NaOH solution. The mixture was stirred at room temperature for 3 hours to form a gel-like, cross-linked poly(sodium aspartate). The pH value was adjusted from 10.5 to 7.1. The gel was rotary-evaporated to dryness and further dried at 60° C./$\leq 0.1$ mmHg for 5.5 hours to give crosslinked, solid poly(sodium aspartate) (1.53 g, 89.5%).

A summary of the poly(sodium aspartate) polymers prepared above is set forth in Table 1 as follows:

TABLE 1

Molecular weights of Prepared Poly(sodium aspartate) Polymers

| EXAMPLE | WEIGHT AVERAGE MOLECULAR WEIGHT (× 1000) |
| --- | --- |
| Preparation 4 | 3.25 |
| Preparation 3 | 3.25 |
| Preparation 6 | 20.2 |
| Preparation 8 | 66 |
| Preparation 9 | 71 |
| Example 4 | 80 |
| Example 6 | 92 |
| Example 5 | 94 |
| Example 7 | 95 |
| Example 9 | 104 |
| Example 11 | 114 |

EXAMPLES 14–40

In the following Examples, new and improved N-alkylolaspartamide/aspartic acid copolymers, N-hydroxyalkoxyalkylaspartamide/aspartic acid copolymers, N-hydroxyalkylaminoalkylaspartamide/aspartic acid copolymers, N-alkoxyalkylaspartamide/aspartic acid copolymers, N-(o-sulfoalkyl)aspartamide/aspartic acid copolymers were prepared. A summary of preparation data is presented in Table 2 below.

EXAMPLE 14

To a suspension of poly(succinimide) (2.50 g, if this sample of poly(succinimide) was hydrolyzed with NaOH, poly(sodium aspartate) of molecular weight 66,000 was obtained) in water (20 g) was added a solution of ethanolamine (1.53 g) in water (20 g). After the reaction mixture was stirred at room temperature for 1 hour, a clear solution was obtained. The molecular weight of the polymer was found by GPC analysis to be 60,000. $^{13}$C NMR analysis of the sample showed the polymer contained 30 mol % of N-hydroxyethylaspartamide.

EXAMPLE 15

The product solution of Example 14 was dialyzed with a membrane of MWCO 3500 to provide a pure M-2-hydroxy ethyl aspartamide/aspartic acid copolymer. The molecular weight and N-hydroxyethylamine incorporation are listed in Table 2.

EXAMPLE 16

A N-2-hydroxyethylaspartamide/aspartic acid copolymer solution was prepared in accordance with the method of Example 14, except that only 0.50 equivalent of ethanolamine was charged. After a suspension of poly/succinimide) (5.0 g, 0.050 mol) in DI water (35 g) was stirred with ethanolamine (1.53 g, 0.0251 mol, 0.50 equivalents) at r.t. for 20.8 h., 0.041 moles of NaOH solution was added dropwise to form a clear solution of pH 12.98. The solution was further stirred for 1 h. and then neutralized with dilute HCl to pH 6.7. The MW determined by GPC and EA incorporation determined with $^{13}$C NMR are summarized in Table 2.

EXAMPLE 17

To a stirred powder of poly(suc) (15.0 g, 0.153 mol) in a 250 ml flask was added dry DMF (60 g) and ethanolamine (4.66 g, 0.0765 mol, 0.50 equivalent). The solution was stirred at r.t. for 4 h. and at 120 to 150° C. for 1 hour 35 min. After the solution was cooled to room temperature, 200 ml of ethanol was added. The precipitate was filtered in vacuo, dried at 70 to 80° C./vacuum to give 9.7 g of solids. The solids were ground and suspended in DI water (60 g). A NaOH solution (4.1 g of 50% NaOH and 7.0 g of DI water) was added over 25 min. at pH≦11.8. The resultant solution was further stirred for 50 min. and then neutralized to pH 7.5 to afford almost pure N-2-hydroxyethylaspartamide/aspartic acid (HEA/ASP) copolymer.

EXAMPLE 18

Part of the copolymer solution prepared in Example 17 was dialyzed (membrane MWCO 500) for 30 h. The dialyzed solution was concentrated to give pure EA-poly(asp) copolymer. The MW and EA incorporation are summarized in Table 2.

EXAMPLES 19–33

Synthesis of other derivatized aspartic acid copolymers were performed similarly. The results are summarized for Examples 19–33 in Table 2.

EXAMPLE 34

To a suspension of poly(succinimide) (2.50 g, if this sample of poly(succinimide) was hydrolyzed with NaOH, poly(sodium aspartate) of molecular weight 66,000 was obtained) in water (20 g) was added a solution of 2-amino-2-methyl-1,3-propanediol (2.63 g) in water (23 g). The reaction mixture was stirred at room temperature for 30 hours to provide a clear solution. The molecular weight of the polymer was found to be 69,000. $^{13}$C NMR analysis of the sample showed the polymer contained 2.9 mol % of N-(2-methyl-1,3-dihydroxypropyl)aspartamide.

EXAMPLE 35

To a solution of poly(succinimide) (1.23 g, if this sample of poly(succinimide) was hydrolyzed with NaOH, poly (sodium aspartate) of MW 94,000 was obtained) in DMF (15 g was added 2-amino-2-methyl-1,3-propanediol (1.33 g). The reaction mixture was stirred at room temperature for 18 hours. 150 mL of a mixed solvent (ethanol:cyclohexane, 1:2) was added and the resultant precipitate were collected by centrifugation, washed with ethanol and dried at 60° C. under vacuum to provide a water soluble copolymer. $^{13}$C NMR analysis of the sample showed the polymer contained 29 mol % of N-(2-methyl-1,3-dihydroxypropyl) aspartamide.

EXAMPLE 36

An N-(2-hydroxymethyl-1,3)aspartamide/aspartic acid copolymer was prepared by reacting a tris(hydroxy-methyl) amino methane derivatizing agent with a polysuccinimide in accordance with the method of Example 35. The results obtained are set forth in Table 2.

EXAMPLE 37

To a stirred suspension of polysuccinimide (2.50 g, when this sample of polysuccinimide was hydrolyzed with NaOH, a polysodium aspartate having a molecular weight of 48,000 was obtained) in deionized water (10 g) was added dropwise at pH=10.4 a solution of 2-(2-aminoethoxy)ethanol (1.34 g) in deionized water (5 g). After the reaction mixture was stirred at room temperature for 12 hours, NaOH solution (1.46 g of 50% NaOH was diluted with 5 g deionized water) was added dropwise at a pH≦12. This provided a solution of N-2-(2-hydroxyethoxy)ethylaspartamide/aspartic acid copolymer. The molecular weight of copolymer composition is set forth in Table 2.

EXAMPLE 38

To a stirred solution of polysuccinimide (15 g, 0.153 mol) in DMF (115 mL) was added dropwise a solution of 2-methoxyethylamine (0.81 g, 0.01 mol) in DMF (30 mL). The solution was stirred for 15 hours at room temperature and at 100 to 160° C. for 1.5 hours. The solution was cooled to room temperature and 250 mL of ethanol was added. The precipitate was collected by filtration, washed with ethanol and dried in vacuo. The dried solid was suspended in deionized water (52 g). NaOH solution (11.7 g of 50% NaOH and 40 g deionized water) was added dropwise at pH≦12.7. The solution was stirred for 1 hour and 10 minutes and the pH was adjusted to 8.11. The copolymer molecular weight and composition is set forth in Table 2.

EXAMPLE 39

To a stirred solution of polysuccinimide (10. G, 0.102 mol) in DMF (80 mL) was added dropwise a solution of ethanolamine (1.87 g, 0.0306 mol) in DMF (15 mL). The solution was further stirred at room temperature for 15 hours. Aminoethylsulfonate (14.0 g, 0.092 mol) in DMF and pyridine (10.0 g) were added. The solution was stirred at 22 to 40° C. for 24 hours. 180 mL of ethanol was added. The precipitated polymer was collected by filtration, dried in vacuo, ground and suspended in deionized water (60 g). 50% of NaOH (8.16 g) was added dropwise to the stirred suspension at pH≦11.0 to provide a crude N-(2-O-sulfo) ethylaspartamide/aspartic acid copolymer (SEA/ASP). Dialysis of the crude product yielded a pure EAS/ASP copolymer. The produce molecular weight determined by GPC and composition determined with $^{13}$C NMR is summarized in Table 2.

EXAMPLE 40

To a suspension of polysuccinimide (10.0 g) in deionized water (50 g) was slowly added a solution of 2-(2-aminoethylamino)ethanol (5.31 g) in deionized water (10 g)

at pH off 10.2 to 10.33 at room temperature. Thereafter, the suspension was stirred at room temperature for 12 hours. A NaOH solution (5.87 g of a 50% NaOH solution and 5.0 g deionized water) was added dropwise at pH≦11 to hydrolyze the remaining succinimide units. This provided a copolymer of N-2-(2-hydroxyethylamino)ethylaspartamide/ aspartic acid copolymer. The molecular weight and copolymer composition is set forth in Table 2 below.

TABLE 2

Hydroxy and Ether Derivatized Amino Acid Copolymers

| Example | MW of Polysuc | M % of Derivatizing Agent Charged | Reaction Temp & Time | Reaction Medium | Amine Conversion (%) | Product Composition | Product MW |
|---|---|---|---|---|---|---|---|
| 14 | 66000 | 100% EA[1] | rt, 27 h | water | 30 | 30/70 HEA/ASP[2] | 60000 |
| 15 | — | — | — | — | — | 28/72 HEA/ASP | 33000 |
| 16 | 94000 | 50% EA | rt, 20 h | water | 56 | 28/72 HEA/ASP | 43000 |
| 17 | 72000 | 50% EA | rt, 4 h, 120–50° C., 1.5 h | DMF | 100 | 50/50 HEA/ASP | 16000 |
| 18 | 72000 | 50% EA | rt, 4 h 120–50° C., 1.5 h | DMF | 100 | 50/50 HEA/ASP | 16000 |
| 19 | 72000 | 50% EA | rt, 4 h 120–50, 1.4 h | DMF | 100 | 50/50 HEA/ASP | 16500 |
| 20 | 48000 | 10% EA | rt, 3.3 h 120–50, 1.6 h | DMF | 100 | 10/90 HEA/ASP | 16400 |
| 21 | 48000 | 20% EA | rt, 4 h 120–65, 1.2 h | DMF | 100 | 20/80 HEA/ASP | 16500 |
| 22 | 72000 | 4% EA | rt, 4 h 120–65° C., 4.2 h | DMF | 100 | 4/96 HEA/ASP | 9400 |
| 23 | — | — | — | — | — | 6/94 HEA/ASP | 9600 |
| 24 | 72000 | 6% EA | 150–80° C., 5 h | DMF | 100 | 6/94 HEA/ASP | 7100 |
| 25 | 48000 | 35% EA | rt, 4 h 130–75° C., 1.3 h | DMF | 100 | 35/65 HEA/ASP | 9400 |
| 26 | 48000 | 30% EA | rt, 4 h 120–60° C., 1 h | DMF | 100 | 30/70 HEA/ASP | 10000 |
| 27 | 48000 | 25% EA | rt, 5 h 140–55° C., 0.9 h | DMF | 100 | 25/75 HEA/ASP | 11000 |
| 28 | 48000 | 40% EA | rt, 3.5 h 120–60° C., 1.3 h | DMF | 100 | 40/60 HEA/ASP | 8300 |
| 29 | 48000 | 27% EA | rt, 4.4 h 80–100° C., 1 h | DMF | 100 | 30/70 HEA/ASP | 29000 |
| 30 | 48000 | 30% EA | rt, 5 h 110–30° C., 0.5 h | DMF | 100 | 30/70 HEA/ASP | 35000 |
| 31 | 48000 | 80% EA | rt, 3 h 120–65° C., 1.3 h | DMF | 100 | 80/20 HEA/ASP | 13300 |
| 32 | 3250 | 60% EA | rt, 10 h | water | 50 | 30/70 HEA/ASP | 3300 |
| 33 | 48000 | 30% APO[3] | rt, 22 h 60–80° C., 1 h | DMF | 100 | 30/70 HPA/ASP[4] | 37000 |

TABLE 2-continued

Hydroxy and Ether Derivatized Amino Acid Copolymers

| Example | MW of Polysuc | M % of Derivatizing Agent Charged | Reaction Temp & Time | Reaction Medium | Amine Conversion (%) | Product Composition | Product MW |
|---|---|---|---|---|---|---|---|
| 34 | 66,000 | 100% AMPD[5] | rt, 30 h | water | 2.9 | 3/97 MDHA/ASP[6] | 69,000 |
| 35 | 94000 | 100% AMPD | rt, 20 h | water | 29 | 29/71 MDHA/ASP | 34000 |
| 36 | 94000 | 10% Tris[7] | 50° C., 5 h | DMF | 10 | 10/90 Tris-A/ASP[8] | 46000 |
| 37 | 48000 | 50% AEE[9] | rt, 12 h | water | 57 | 29/71 HEEA/ASP[10] | 46000 |
| 38 | 72000 | 7% MEA[11] | rt, 15 h rt-145° C., 1.3 h, 145–160° C., 0.5 h | DMF | 100 | 7/93 MEA/ASP[12] | 10700 |
| 39 | 72000 | 30% EA | rt, 15 h, then SO$_3$ in DMF, rt | DMF | 98 | 29/71 SEA/ASP[13] | 51000 |
| 40 | 48000 | 50% AEAE[14] | rt, 12 h | water | 59 | 30/70 HEAE/ASP[15] | 45000 |

[1]EA = Ethanolamine
[2]HEA/ASP = N-(2-hydroxyethyl)aspartamide/aspartic acid copolymer
[3]APO = 1-Amino-2-propanol
[4]HPA/ASP = N-(2-hydroxypropyl)aspartamide/aspartic acid copolymer
[5]AMPD = 2-Amino-2-methyl-1,3-propanediol
[6]MDHA/ASP = N-(2-methyl-1,3-dihydroxypropyl)aspartamide/aspartic acid copolymer
[7]Tris = Tris(hydroxymethyl)amino methane
[8]Tris-A/ASP = N-(2-hydroxymethyl-1,3-)aspartamide/aspartic acid copolymer
[9]AEE = 2-(2-aminoethoxy)ethanol
[10]HEEA/ASP = 2-(2-hydroxyethoxy)ethylaspartamide/aspartic acid copolymer
[11]MEA = 2-Methoxyethylamine
[12]MEA/ASP = N-(2-methoxyethyl)aspartamide/aspartic acid copolymer
[13]SEA/ASP = N-(2-O-sulfoethyl)aspartamide/aspartic acid copolymer
[14]AEAE = 2-(2-aminoethylamino)ethanol
[15]HEAE/ASP = N-2-(2-hydroxyethylamino)ethylaspartamide/aspartic acid copolymer

EXAMPLE 41

To a suspension of poly(succinimide) (1.23 g) when this poly(succinimide) was hydrolyzed with NaOH, poly(sodium aspartate) of MW 66,000 was obtained) in water (9 g) was added a solution (pH=11.0) of disodium aminomethylphosphonate which was prepared by adding sodium hydroxide solution (10.0 g, 10.0%) to aminomethylphosphonate (1.13 g) in water (5 g). The reaction mixture was stirred at room temperature for 13 hours. A sodium hydroxide solution (0.3 g, 10.0%) was added to hydrolyze unreacted poly(succinimide). The product was characterized by $^{13}$C and $^{31}$P NMR methods. The molecular weight of the polymer was found to be 71,000. NMR analysis of the sample shows that the polymer contained 2 mol % of N-phosphonomethylaspartamide.

EXAMPLE 42

A portion of the N-phosphonomethylaspartamide/aspartic acid copolymer prepared in Example 41 was purified by dialyzing the solution against DI water using a dialysis membrane (MWCO 3500) to provide a purified copolymer solution. The MWs determined with GPC analysis and AMPA incorporation determined with $^{13}$C NMR and $^{31}$P NMR are summarized in Table 3.

EXAMPLES 43–44

Additional N-phosphonomethylaspartamide/aspartic acid copolymers were prepared in accordance with the method of Example 41 except that only one equivalent of NaOH was used.

EXAMPLE 45

To a suspension of poly(succinimide) (1.23 g, when this poly(succinimide was hydrolyzed with NaOH, poly(sodium aspartate) of MW 94,000 was obtained) and aminomethylphosphonic acid (1.38 g) in water (15 g) was added 25% trimethylamine aqueous solution (7.9 g, pH=11.4). The reaction mixture was stirred to give a clear solution. The product was characterized by $^{13}$C and $^{31}$P NMR methods. The molecular weight of the polymer was found to be 89,000. NMR analysis of the sample shows that the polymer contained 5 mol % of N-phosphonomethylaspartamide.

EXAMPLE 46

AMPA (99%, 2.78 g, 0.025 mol) and DMAP (4-(N,N-dimethylamino)pyridine, 3.05 g, as catalyst) was added an alcoholic solution prepared from KOH(2.74 g, 0.0500 mol) and anhydrous ethanol (40 mol) over 30 min. To this stirred solution cooled with ice water was added dropwise under N$_2$ solution of poly(succinimide) (2.45 g, 0.0250) in DMF (25 ml) over 2 h. Pink precipitate formed as poly(succinimide) solution was added to the solution of potassium salt of AMPA. The biphase mixture was stirred at 10 to 12° C. for 1.3 hours and at room temperature for 55 hours. 100 ml of 1:1 ethanol/diethyl ether mixed solvent was added to precipitate the polymer product. The solids were filtered in vacuo, washed with 1:1 ethanol/ether (100 ml) and dried at 80° C./house vacuum to afford 6.4 g of light pink solids (yield 89.0%).

EXAMPLE 47

The crude polymer prepared in Example 46 was dissolved in DI water. The solution was adjusted with dilute NaOH to pH 12.0 to hydrolyze any residual poly(succinimide) and stirred at r.t. for 20 min. This solution was then acidified to pH 1.1 and precipitated with 1:1 ethanol/acetone (() ml). The supernatant was decanted and the precipitate was redissolved in DI water. This procedure was repeated once to remove any DMAP and/or AMPA residual. This prepurified polymer was dialyzed (membrane MWCO 12–14 K) to give pure N-2-amino-2-methyl-1,3-dihydroxypropylaspartamide/aspartic acid copolymer. The purity was confirmed both $^{31}$P and $^{13}$NMR analyses. The MW and AMPA incorporation are summarized in Table 3.

EXAMPLE 48

To a solution of poly(succinimide) (2.46 g, when this poly(succinimide) was hydrolyzed with NaOH, poly (sodium aspartate) of MW 94,000 was obtained) in DMF (25 mL) was added a solution of dipotassium aminomethylphosphonate and 4-N,N-dimethylpyridine in anhydrous ethanol (prepared by adding aminomethylphosphonic acid (3.16 g, 87% purity) and 4-N,N-dimethylpyridine (1.67 g) to a solution of KOH (2.80 g) in anhydrous ethanol (13.5 mL)). The suspension was stirred at room temperature for 89 hours. The resultant solids were filtered, washed with ethanol, dried at 60° C. in vacuo, and finally, dissolved in water. The pH of the solution was adjusted to 9.9. After stirring for 30 min., the pH of the solution was readjusted to 8.5. The product was characterized by $^{13}$C and $^{31}$P NMR methods. The molecular weight of the polymer was found to be 17,000. NMR analysis of the sample shows that the polymer contained 9 mol % of N-phosphonomethylaspartamide.

EXAMPLE 49

An N-(2-sulfonoethyl)aspartamide/aspartic acid copolymer was prepared in accordance with the method of Example 46 except that a starting polysuccinimide having a molecular weight of 3250 was used as the starting material and 100 mol % of AMPA was charged as the derivatizing agent. The results are set forth in Table 3 hereinafter.

TABLE 3

N-phosphonoalkylaspartamide/Aspartic Acid Copolymers

| Example | MW of poly (suc)[16], (× 1000) | Mole % of AMPA charged | Initial pH | Rxn Temp (° C.) | Rxn Time (h) | Rxn Solvent | Conversion (%) | Product polymer composition: N-phosphonomethyl-aspartamide/ aspartic acid | Product MW |
|---|---|---|---|---|---|---|---|---|---|
| 41 | 66 | 82 | 10.8 | r.t | 7 | water | 2 | 2/98 | 71000 |
| 42[17] | — | — | — | — | — | — | — | 8/92 | 57000 |
| 43 | 94 | 100 | 6.4 | 80 | 4 | water | 2 | 2/98 | 43000 |
| 44 | 66 | 100 | 7.5 | r.t. | 2 mo. | water | 3 | 3/97 | 57000 |
| 45 | 94 | 100 | 9.7 | r.t. | 0.4 | water | 4 | 5/95 | 89000 |
| 46 | 66 | 100 | — | 0 to r.t. | 55 | DMF/EtOH | 15 | 15/85 | 36000 |
| 47[17] | — | — | — | — | — | — | — | 17/83 | 33000 |
| 48 | 94 | 100 | — | r.t. | 90 | DMF/EtOH | 9 | 9/91 | 16000 |
| 49 | 3250 | 100 | 9.7 | r.t. | 10 | water | 3 | 3/97 | 3400 |

[16]The actual molecular weights of the poly(suc) are unknown. The Mws reported here are those of the hydrolyzed product poly(asp).
[17]Obtained by dialyzing the polymer in the line above.

EXAMPLE 50

To a suspension of poly(succinimide) (1.23 g, when this sample was hydrolyzed with NaOH, poly(sodium aspartate) of MW 66,000 was obtained) in water (10 g) was added to a solution of sodium taurate (pH=10.7, prepared by adding 5.0 g of 10% of NaOH to 1.59 g of taurine in 5 g of water). The resultant reaction mixture with a pH of 9.9 was stirred at room temperature for 13 hours to provide a clear solution. $^{13}$C NMR analysis of the sample showed the polymer contained 11 mol % of N-sulfonoethylaspartamide. The molecular weight of the polymer was found to be 72,000.

EXAMPLE 51

The crude copolymer of Example 50 was dialyzed against DI water using a dialysis membrane (MWCO 3500) to give a purified copolymer product. The MWs and taurine incorporations are summarized in Table 4.

EXAMPLE 52

To a suspension of taurine (0.48 g) in water (5 g) was added 10.0% NaOH (1.3 g) to give a solution of sodium taurate (pH=9.87). This solution was added to a suspension of poly(succinimide) (1.23 g, when this polysuccinimide was hydrolyzed with NaOH, poly(sodium aspartate) of MW 66,000 was obtained) in water (10 g). The suspension was stirred at room temperature for 13 hours. 10.0% of NaOH solution 3.72 g) was added to hydrolyze unreacted succinimide to afford a clear solution. $^{13}$C NMR analysis of the sample showed the polymer contained 1 mol % of N-sulfonoethylaspartamide. The molecular weight of the polymer was found to be 70,000.

EXAMPLE 53

A reaction of sodium salt of aminoethylsulfonic acid (AMS) with poly(suc) was tried using a procedure similar to Example 40. The purified product MW determined with GPC was 68K but $^{13}$C NMR analysis indicated uncertain AMS incorporation (3%).

Example 54. The MWs and HA incorporations are summarized in Table 5.

EXAMPLE 60

To a mechanically stirred suspension (in a 500 ml flask) of poly(suc) (20.2 g, 0.204 mol) in DI water (50.0) under $N_2$ was added dropwise a solution of hydroxylamine prepared from hydroxylamine hydrochloride (8.50 g, 0.122 mol, 0.60 equivalent), DI water, (18.0 g) and 50% NaOH (10.3 g, 0.129 mol). The suspension was further stirred under $N_2$ at r.t. for 21 h. A NaOH solution prepared from NaOH (9.86 g, 0.123 mol, 0.60 equivalent and DI water (16.1 g) was added dropwise at r.t. to the stirred suspension at pH≦9.5. The resulting brown solution was further stirred for 1 h and 20 min. The pH was adjusted with dilute HCl from 8.9 to 7.3 to provide N-hydroxyaspartamide/aspartic acid copolymer.

TABLE 4

Preparation Data of N-2-sulfonoethylaspartamide/aspartic acid

| Example | MW of poly-(suc)[18] (K) | Mole % of AES[19] charged | Initial pH | Rxn temp (° C.) | Rxn time (h) | Rxn solvent | Conversion (%) | copolymer composition: SEA/ASP[20] | Product MW (K) |
|---|---|---|---|---|---|---|---|---|---|
| 50 | 66 | 100 | 9.9 | r.t. | 13 | water | 11 | 11/89 | 72(PSS) |
| 51[21] | — | — | — | — | — | — | — | 13/37 | 36(PSS) |
| 52 | 66 | 30 | 9.9 | r.t. | 13 | water | 3 | 1/99 | 70000 |

[18]The actual molecular weights of the polysuccinimide are not known. The MWs reported here are those of their hydrolyzed product poly(asp).
[19]AES = 2-aminoethylsulfonic acid.
[20]SEA/ASP = N-2-sulfonoethylaspartamide/aspartic acid copolymer.
[21]Obtained by dialyzing the up line polymer.

EXAMPLE 54

To hydroxylamine hydrochloride (1.95 g, 0.0285 mol, 1.11 mole equivalent) was added DI water (20 g) and 50% NaOH (11.06 g, 0.0279 mol) to give a clear solution of pH 7.84. This solution was added over 1–2 min to a suspension of poly(suc) (2.46 g, 0.025 mol) in DI water (20.8 g). This suspension was magnetically stirred at r.t. for 34 h. (The solids were found later from another experiment to disappeared within 15 hours). After the pH was adjusted from 5.9 to 9.0, the solution was stirred for 2.3 h. The pH was finally adjusted from 8.7 to 7.7 to afford a crude N-hydroxyaspartamide/aspartic acid copolymer product.

EXAMPLE 55

The crude product of Example 54 was dialyzed against DI water (membrane MWCO 1000) for 48 h. to remove unreacted hydroxylamine to give a purified copolymer product. The MW determined with GPC and HA incorporation determined with $^{13}$C NMR are summarized in Table 5.

EXAMPLES 56–59

Additional N-hydroxyaspartamide/aspartic acid copolymers were prepared in accordance with the method of

EXAMPLE 61

Part of copolymer prepared in Example 60 was dialyzed (membrane MWCO 500) for 30 hours to give a purified N-hydroxyaspartamide/aspartic acid copolymer. The molecular weight determined with GPC analysis and HA incorporation determined with $^{13}$C NMR are summarized in Table 5.

EXAMPLES 62–66

Additional N-hydroxyaspartamide/aspartic acid copolymers were prepared in accordance with the procedure of Examples 60 and 61. The MWs and HA incorporations are summarized in Table 5.

TABLE 5

Preparation Data for HA/ABP Copolymers

| Example | MW of poly (suc) (K)[22] | Mole % of HA[23] charged | Initial pH | Rxn temp ° C. | Rxn time (h) | Conversion (%) | Product purity | Product Composition: N-hydroxyaspartamide/ aspartic acid | Product MW (K) |
|---|---|---|---|---|---|---|---|---|---|
| 54 | 94 | 1.12 | 7.8 | r.t. | 48 | 65 | crude | 65/35 | 2.2 |
| 55[24] | — | — | — | — | — | — | pure | 46/54 | 1.9 |

TABLE 5-continued

Preparation Data for HA/ABP Copolymers

| Example | MW of poly (suc) (K)[22] | Mole % of HA[23] charged | Initial pH | Rxn temp °C. | Rxn time (h) | Conversion (%) | Product purity | Product Composition: N-hydroxy-aspartamide/ aspartic acid | Product MW (K) |
|---|---|---|---|---|---|---|---|---|---|
| 56 | 3–4 | 100 | 6.8 | r.t. | 69 | 48 | crude | 48/52 | 3.4 |
| 57 | 20 | 100 | 5.7 | 78 | 1 | 72 | crude | 72/28 | 3.9 |
| 58 | 95 | 100 | 8.9 | r.t. 80 | 0.5 0.8 | 54 | crude | 54/46 | 6.0 |
| 59 | 95 | 100 | 7.5 | r.t | 66 | — | crude | — | 4.5 |
| 60 | 95 | 60 | — | r.t. | 21 | 85 | crude | 51/49 | 14 |
| 61[24] | — | — | — | — | — | — | pure | — | 11 |
| 62 | 3–4 | 20 | ? | r.t. | 20 | — | crude | — | 2.6 |
| 63[24] | — | — | — | — | — | — | pure | — | 4.5 |
| 64 | 94 | 30 | 6.8 | r.t. | 26 | 77 | crude | 23/77 | 16 |
| 65[24] | — | — | — | — | — | — | pure | 20/80 | 5.9 |
| 66 | 3–4 | 15 | — | r.t. | 17 | — | crude | — | 2.9 |

[22]The actual Mws of the poly(suc) are not known. The Mws reported here are those of their hydrolyzed product poly(asp).
[23]HA = hydroxylamine. The hydroxylamine was obtained by neutralizing hydroxylamine hydrochloride with one equivalent of NaOH solution.
[24]Obtained by dialyzing the polymer in the line above.

EXAMPLE 67

To a stirred suspension of poly(suc) (5.0 g, 0.050 mol) in DI water (25.0 g) was added a solution of hydroxylamine prepared from hydroxylamine hydrochloride (3.52 g, 0.050 mol, 1.0 equivalent), DI water (5.5 g) and 50% NaOH (3.97 g). This gave a initial pH of 7.44. The suspension was stirred at r.t. for 14.5 h. After the pH was adjusted from 5.8 to 7.1, the solution was stirred for 25 h. The pH was adjusted again to 9.0. and the solution was stirred for 4.5 h. The pH was finally adjusted to 7.2 to provide a crude N-hydroxyaspartamide/aspartic acid copolymer (71 g).

EXAMPLE 68

12.5 g of the copolymer of Example 67 was acidified with dilute HCl to pH 3.5 in order to protonate hydroxylamine residual.

EXAMPLE 69

12.0 g of the copolymer of Example 67 was acidified to pH 2.3 and then stirred with $I_2$ (1.08 g) for 3 h. The pH dropped to 1.63 (still some $I_2$ present).

EXAMPLE 70

10.4 g of the copolymer of Example 67 was evaporated to dryness to give 1.52 g of solids.

EXAMPLE 71

12.0 g of the copolymer of Example 67 (pH 7.2) was stirred with $I_2$ (1.08 g). The pH dropped from 7.2 to 2.9 within one min. and to 2.27 within 10 min.

The MWs of these polymer samples were determined with GPC two days after the treatments and determined again after they were stored in a refrigerator for 1.5 months. The results are summarized in Table 6. When glycol formate was added to part of the copolymer solution in water at pH 7.2 of Example 67, the molecular weight of the copolymer did not change for at least three months.

TABLE 6

Stabilized HA/ASP Copolymers

| Example | Initial MW (PEG, K) | Treatment | MW on day n (PEG, K) day n MW | Polymer composition: N-hydroxy-aspartamide/ aspartic acid | Comments |
|---|---|---|---|---|---|
| 57 | 3.4 | no, pH 7.5 | 105 2.7 | — | the polymer was degraded |
| 58 | 3.9 | no, pH 7.7 | 105 1.7 | — | the polymer was degraded |
| 59 | 6.0 | no, pH 6.9 | 105 2.6 | — | the polymer was degraded |
| 65 | 5.9(PSS) | yes, dialysis | 180 6.3 (PEG) | 23/77 | the pure polymer was stable |

TABLE 6-continued

Stabilized HA/ASP Copolymers

| Example | Initial MW (PEG, K) | Treatment | MW on day n (PEG, K) day n MW | Polymer composition: N-hydroxy-aspartamide/ aspartic acid | Comments |
|---|---|---|---|---|---|
| 67 | 3.9 | no, pH 7.2 | 45 2.8 | 59/41 | the polymer was degraded |
| 68 | 4.1 | yes, pH 3.5 | 45 3.9 | 64/36 | $H_2NOH$ was protonated and the polymer was stabilized |
| 69 | 4.1 | yes, pH 2.3 then $I_2$ | 45 3.6 | 60/40 | $H_2NOH$ was oxidized and the polymer was stabilized |
| 70 | 3.9 | yes, evaporated to dryness | 45 3.9 | 62/38 | the polymer was stabilized at solid state |
| 71 | 4.0 | yes, pH 7.2 then $I_2$ | 45 3.9 | 65/35 | $H_2NOH$ was oxidized and the polymer was stabilized |

EXAMPLE 72

Biodegradability of the copolymers, terpolymers and polypolymers in accordance with this invention were evaluated. Although the homopolymer of 2-hydroxyethylaspartamide or 2-hydroxyethylglutamide are not biodegradable as disclosed by P. Neri, et al and M. S. Freeman, respectively. The copolymers, terpolymers and polypolymers in accordance with this invention were unexpectedly found to be biodegradable. The biodegradability of the polymers increases as the molar ratio of alkanolamide/amino acid decreases. The copolymers with molar ratios of alkanolamide/amino acid of about 30/70 and less than 30/70 are readily and completely biodegradable. The copolymers are non-inoculum toxic and non-biotically degradable.

1. Inherent Biodegradability Test Method

The Zahn-Wellens/EMPA Test Method as described as Test Method 302B in the OECD Guidelines for Testing of Chemicals adopted by the council on Jul. 17, 1992 was used to determine the inherent biodegradability of the said polymers invented. The biodegradation process is monitored by determination of DOC (dissolved Organic Carbon) in filtered samples taken from the test vessels. The ratio of eliminated (loss of) DOC, corrected for the blank, after each time interval, to the initial DOC value is expressed as the percentage biodegradation at the sampling time. The percentage biodegradation (DOC loss) is plotted against time to give the biodegradation curve (FIG. 1). $^{13}C$ NMR spectroscopic analysis of the concentrated final test suspension for the 30/70 L-2-hydroxyethylaspartamide/aspartic acid copolymer indicated that no residual L-2-hydroxyethylaspartamide/aspartic acid copolymer existed.

Reference Compound: In order to check the functional capability of the activated sludge, a test using ethylene glycol of known biodegradability was run in parallel in each series.

Apparatus: (a) glass jugs with a volume of 4 liters, each equipped with a magnetic stirring bar and a glass tube to introduce air at about 5 cm above the bottom of the glass jug, permitting aeration and agitation. (b) A supply of compressed air from a $CO_2$ purifier delivering air free from $CO_2$, dust, oil and organic impurities, and a wash-bottle containing double deionized water. (c) 0.45 µm filters were used to filter samples for DOC analysis.

Stock Solutions for Mineral Medium and Mineral Solutions: These were prepared in the same way as described in Test Method 302B in the OECD Guidelines for Testing of Chemicals. Double deionized water was used as the water source.

Inoculum: A fresh sample of activated sludge from the aeration basin of the Spring Brook Sewage Treatment Plant, Naperville, Ill., was collected and centrifuged for 15 minutes. The settled sludge was washed twice with mineral medium and centrifuged. The sludge was then dispersed in mineral medium and aerated for 6 days. The inoculum was not adapted with the test substances.

Preparation of Test Vessels: To each test jug was introduced 2400 ml mineral medium and the appropriate amount of test substances and inoculum to reach 45–400 DOC/l and 1.0 grams suspended sludge/l, respectively, in the final volume of 2.5 liters. The ratio of inoculum to test compound (as DOC) was 5–22 as specified in Table 7. The following test jugs were used:

2 test jugs containing 50/50 HEA/ASP copolymer (400 mg DOC/L) and inoculum (1000 mg suspended sludge/L) (test suspension)

1 test jug containing 80/20 HEA/ASP copolymer (400 mg DOC/L) and inoculum (1000 mg suspended sludge/L) (test suspension)

1 jug containing 30/70 HEA/ASP copolymer (45 mgDOC/L) and inoculum (1000 mg suspended sludge/L) (test suspension)

2 test jugs containing inoculum alone (1000 mg suspended sludge/L) (inoculum blank)

1 test jug containing reference ethylene glycol (400 mg DOC/L) and inoculum (1000 mg suspended sludge/L) (procedure control)

1 test jug containing reference 50/50 HEA/ASP copolymer (400 mg DOC from the copolymer/L), ethylene glycol (400 mg DOC from ethylene glycol/L) and inoculum (1000 mg suspended sludge/L) (toxicity control)

The tests were run in the dark. The pH of the test suspensions was adjusted to 7.0 to 7.4 with dilute NaOH or HCl initially and when samples were withdrawn for analysis. Samples of sludge suspension were filtered through 0.45 μm filters mounted on 10 ml syringes. The test conditions and the results obtained are summarized in Table 7.

Preparation of Test Jugs: (a) To each one-gallon glass jug was added 2400 ml of mineral medium, activated sludge suspension to give a inoculum concentration of suspended solid of 30 mg/l in the final 2.5 liters of inoculated mixture. These inoculated mixtures were aerated with $CO_2$-free air overnight to purge the system of carbon dioxide. (b) Each test substance or reference stock solution of known concentration was added to give a concentration of 15 mg DOC/l except the two jugs for blank control where no test substance was added. The final volume of suspension in all jugs was made-up to 2.5 liters by the addition of mineral medium

TABLE 7

Inherent Biodegradation Test Conditions and Results

| Test substance & concentration (mg DOC/l) | Sludge concentration (mg/l) | Percent DOC Loss | | | | | | |
|---|---|---|---|---|---|---|---|---|
| | | Day 4 | Day 11 | Day 14 | Day 19 | Day 25 | Day 28 | Day 36 |
| 50/50 HEA/ASP[25], 200 | 1000 | 9.2 | 14.4 | 17.7 | 22.0 | 27.7 | 27.8 | 29.6 |
| 30/70 HEA/ASP, 45 | 1000 | 11.1 | 44.9 | 52.4 | 70.7 | 87.1 | 89.1 | 91.1 |
| 80/20/HEA/ASP, 200 | 1000 | 6.3 | 7.9 | 9.1 | 9.8 | 16.2 | 18.1 | 21.5 |
| Ethylene glycol, 200 | 1000 | 100 | 100 | 100 | 100 | 100 | — | — |
| Ethylene glycol[26], 200 | 1000 | 111.5 | 114.5 | 117.0 | 128.7 | 135.9 | 135.1 | 137.4 |
| 50/50 HEA/ASP 200 | | | | | | | | |

[25]HEA/ASP = N-2-hydroxyethylaspartamide/aspartic acid copolymer.
[26]The total DOC loss % = Total DOC loss/Initial DOC/ethylene glycol × 100. Therefore, the DOC loss % of the 50/50 HBA/ABP = total DOC loss − DOC loss % from ethylene glycol.

EXAMPLE 73

Ready, Ultimate Biodegradability Test Method

The ready, ultimate biodegradability of the polymers in this invention was tested with the 301B $CO_2$ Evolution Test Method as described in the OECD Guideline for Testing of Chemicals adapted in Jul. 17, 1992. A measured volume (2.5 liters) of inoculum (30 mg suspended sludge/l) mineral medium containing a known concentration of the test polymer (15 mg DOC/l) as the nominal sole source of organic carbon was aerated by the passage of carbon dioxide-free air at a controlled rate (80 ml/l) in the dark. Biodegradation was monitored by determining the $CO_2$ produced. The $CO_2$ was trapped in barium hydroxide (0.0125 M). The amount of carbon dioxide produced from the test substance (corrected for that derived from blank inoculum) was expressed as a percentage of theoretical $CO_2$ (% Th$CO_2$).

Apparatus: (a) One-gallon jugs, each filled with an aeration tube reaching nearly to the bottom of the vessel and an outlet connected via plastic tubes to trapping cylinders containing 100 ml of 0.0125M barium hydroxide solutions. (b) A magnetic stirring bar was used for each test jug. (c) A supply of compressed air passed through a $CO_2$-purifier to deliver $CO_2$-free air to the test jugs.

Water Source: Double deionized water was used all over in the test.

Preparation of Stock Solution for Mineral Medium and of Mineral Medium Solution: They were prepared in the same way as described in 301B $CO_2$ Evolution test of the OECD Guidelines for Testing of Chemicals adapted in Jul. 17, 1992.

Inoculum: The inoculum source is prepared in the same way as described earlier in the Inherent Biodegradation test. Again, the inoculum was not adapted to test substances.

previously aerated by $CO_2$-free air. (c) One jug was used to check any inhibitory effect of each test polymer, by adding both the test polymer and reference (sodium acetate) at 15 mg DOC/l for both. (d) One jug was also used to check if the test polymer was degraded biotically by using uninoculated solution of each test polymer.

2 ml of $H_2O_2$ as a toxic substance was added to sterilize the test solution. (e) Three absorption cylinders, each containing 100 ml of 0.0125M barium hydroxide solution were connected in a series to each one-gallon jug. The solution was free from precipitate and its strength was determined before use. (f) Start the test by bubbling $CO_2$-free air through the test at a rate of 70 ml/min.

Number of jugs:

2 jug containing 50/50/ HEA/ASP and inoculum (test suspension)

2 jugs containing 30/70 HEA/ASP and inoculum (test suspension)

1 jug containing 2-hydroxyethylamine and inoculum (test suspension)

2 jugs containing inoculum alone (inoculum blank)

1 jug containing reference sodium acetate and inoculum (procedure control)

1 jug containing 50/50 HEA/ASP copolymer, sodium acetate and inoculum (toxicity control)

1 jug containing 50/50 HEA/ASP copolymer and sterilizing agent $H_2O_2$ (abiotic sterile control)

$CO_2$ Determination: The $CO_2$ evolution was followed in parallel for all test jugs. On days of $CO_2$ measurement, the barium hydroxide absorber closest to the test jug was disconnected and titrated with 0.04723 M HCl using phenophthalein as the indicator. The remaining absorbers were moved one place closer to the test jug and a new absorber containing 100 ml of fresh 0.0125M barium hydroxide was placed at the far end of the series. Titration was made when substantial precipitate was seen in the first trap and before any was evident in the second.

Treatment of Results:

The amount of $CO_2$ produced was calculated using the following equation 1:

$$(M_{HCl} \times ml_{HCl\ titrated})_{initial} - (M_{HCl} \times ml_{HCl\ titrated})_{remaining} \times 44 \quad \text{(Equation 1)}.$$

The weight of $CO_2$ from test substance=$CO_2$ from inoculum plus test substance−$CO_2$ from inoculum (blank). The percentage of $CO_2$ produced is calculated from the following:

$$\%\ ThCO_2\ Produced = \frac{mg\ CO_2\ produced}{(mg\ theoretical\ CO_2\ of\ test\ substance\ added)} \quad \text{(Equation 2)}$$

Based on the OECD Guidelines for Testing of Chemical, a $CO_2$ evolution test appoints a limit of 60% of theoretical evolution of carbon dioxide for proving ready biodegradation. The rest of organic carbon may be incorporated into specific formation of biomass and new metabolic side products. In fact, $^{13}c$ NMR study on the concentrated final test suspension from the jug containing 30/70 HEA/ASP copolymer and inoculum indicated that no residual of the copolymer existed in the test suspension, suggesting the copolymer was completely biodegraded. The test results summarized in Table 8 indicate that the biodegradability of HEA/ASP copolymers increases as the HEA/ASP ratio decreases. Ready and complete biodegradation can be achieved by control the copolymer HEA/ASP ratio to about or less than 30/70. The biodegradability of other copolymers or terpolymers or polypolymers would be similarly controlled. The results of toxicity control test and abiotic control test indicate that the HEA/ASP copolymers are non-toxic and non-abiotic degradable. The 2-hydroxyethylamine used to react with polysuccinimide to make the HEA/ASP copolymers is also readily and completely biodegradable. The unreacted hydroxyalkylamines and alkoxyalkylamine residues in the copolymer, terpolymer and poly polymer solutions do not raise concerns with respect to their biodegradability in the environment.

Although the present invention has been described with reference to certain preferred embodiments, modifications or changes may be made therein by those skilled in the art. For example, glutamic acid may be substituted for the aspartic acid shown in the Examples. Terpolymers and polypolymers may be made in accordance with the procedures described herein by either batch processing wherein a plurality of derivatizing agents is reacted with the poly(succinimide) in the same reaction mixture at the same time, or by a sequential derivatization method, wherein the polysuccinimide is sequentially derivatized one derivatizing agent at a time with recovery and resuspension of the copolymer being performed between each derivatization step. All such modifications and changes may be made herein without departing from the scope and spirit of the present invention as defined by the appended claims.

What is claimed is:

1. A water soluble, crosslinked poly(amino acid) polymer comprising units having the formula:

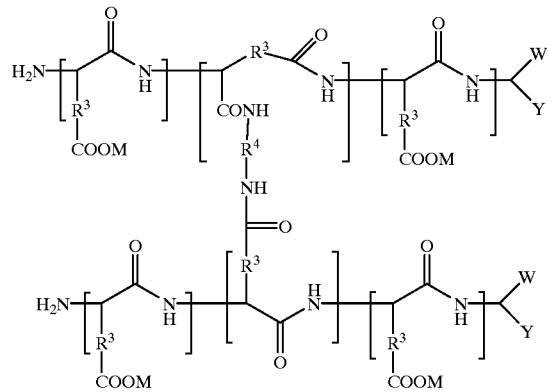

wherein M is a cation selected from the hydrogen, alkali metal, alkaline earth metal, ammonium or alkyl-substituted ammonium cations; $R^3$ is a divalent alkylene of 1 to 2 carbon atoms; $R^4$ is divalent alkylene of 1 to 12 carbon atoms, cycloalkylene, arylene, alkarylene; W is $CO_2M$; and $Y=R^3CO_2M$, and structural isomers thereof, said crosslinked polymer having a weight average molecular weight of greater than or equal to 100,000.

2. A water soluble, crosslinked poly(amino acid) polymer comprising units having the formula:

TABLE 8

| | Ready and Ultimate Biodegradation Test Conditions and Results | | | | | | | |
|---|---|---|---|---|---|---|---|---|
| Test substance & concentration | mg | % ThCO$_2$ Produced | | | | | | |
| (mg DOC/l) | sludge/l | Day 5 | Day 12 | Day 15 | Day 20 | Day 24 | Day 28 | Day 35 |
| 30/70 HEA/ASP copolymer[27], 15 | 30 | 0 | 22.2 | 42.5 | 53.1 | 59.4 | 64.2 | 73.4 |
| 50/50 HEA/ASP copolymer, 15 | 30 | 1.8 | 9.1 | 11.0 | 13.1 | 19.2 | 21.3 | 24.3 |
| Sodium acetate, 15 | 30 | 60.0 | 77.4 | 79.0 | 81.4 | 84.8 | 85.9 | 85.9 |
| 2-hydroxy-ethylamine, 15 | 30 | 54.0 | 70.4 | 74.7 | 76.3 | 80.2 | 82.1 | 82.1 |

[27]HEA/ASP = N-2-hydroxyethylaspartamide/aspartic acid copolymer.

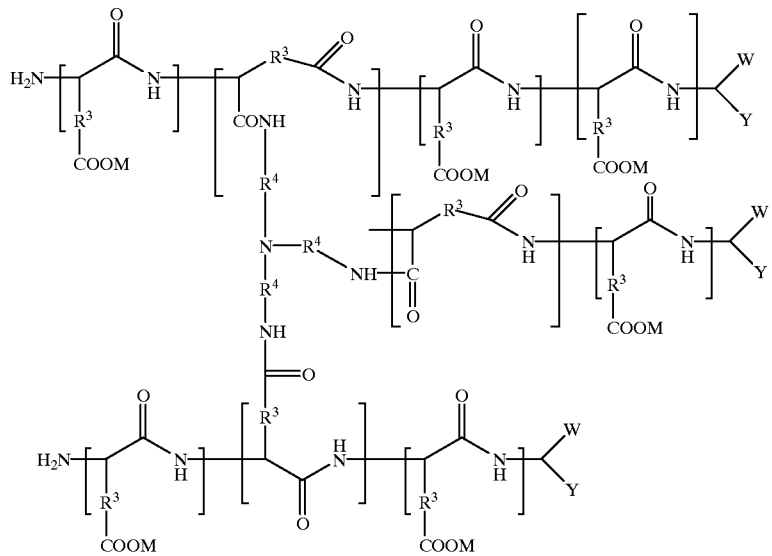

wherein M is a cation selected from the hydrogen, alkali metal, alkaline earth metal, ammonium or alkyl-substituted ammonium cations; $R^3$ is a divalent alkylene of 1 to 2 carbon atoms; $R^4$ is divalent alkylene of 1 to 12 carbon atoms, cycloalkylene, arylene, alkarylene; W is $CO_2M$; and $Y=R^3CO_2M$, and structural isomers thereof, said crosslinked polymer having a weight average molecular weight of greater than or equal to 100,000.

3. A derivatized poly(amino acid) polymer having a polymer backbone comprising units of formula:

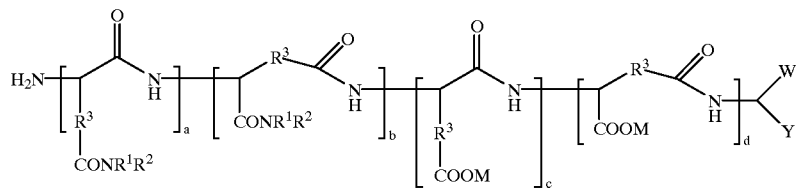

wherein $R^1$ is H or $C_1–C_4$ alkyl; $R^2$ is OH, ZOH, $ZOPO_3M_2$, $ZOSO_3M$, $ZOR^4$, or $GPO_3M_2$; $R^3$ is a divalent alkylene having 1 to 2 carbon atoms; $R^4$ is $C_1–C_4$ alkyl or benzyl; Z is selected from $C_1–C_{12}$ alkyl, cycloalkyl and aryl, $CH_2CH_2(OCH_2CHR^5)_p(OCH_2CH_2)_q$, $CH_2CH_2(NR^5CH_2CHR^6)_r$, wherein p is 0 to 50, q is 0 to 50, p+q=1 to 50, r is 1 to 50; $R^5$ is H or $CH_3$; $R^6$ is H or $CH_3$; G is selected from $C_1–C_{30}$ alkyl, cycloalkyl, alkenyl, aryl, alkaryl, aralkyl or any of the foregoing substituted with at least one group selected from OH, O-alkyl, Cl, Br, $CO_2M$, and $PO_3M_2$ groups; M is a cation selected from hydrogen, alkali metal, alkaline earth metal, ammonium and alkyl-substituted ammonium cations; W is selected from $CO_2M$ and $CONR^1R^2$; Y is selected $R^3CO_2M$ and $R^3CONR^1R^2$; a, b, c and d are mol percentages such that (a+b)/(a+b+c+d)=0.01% to 99.99%; a/(a+b)= 0.00 to 100.00%; b/(a+b)=0.00 to 100.00%; c/(c+d)=0.00 to 100.00%; d/(c+d)=0.00 to 100.00%; and a+b+c+d=100%, said polymer having a weight average molecular weight of from about 300 to about 100,000.

4. A polymer as defined in claim 3, wherein the polymer is biodegradable and wherein (a+b)/(a+b+c+d) is from about 0.01% to about 50%.

5. A polymer as defined in claim 3, wherein $R^2$ is alkylol and wherein (a+b)/(a+b+c+d) is from about 0.01 to about 30%.

* * * * *